US012650191B2

(12) United States Patent
Cao

(10) Patent No.: US 12,650,191 B2
(45) Date of Patent: Jun. 9, 2026

(54) FEMALE CONNECTOR AND CONNECTOR ASSEMBLY

(71) Applicant: Illinois Tool Works Inc., Glenview, IL (US)

(72) Inventor: Cong Cao, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/643,056

(22) Filed: Apr. 23, 2024

(65) Prior Publication Data

US 2024/0353040 A1 Oct. 24, 2024

(30) Foreign Application Priority Data

Apr. 24, 2023 (CN) .......................... 202310450135.7
Mar. 13, 2024 (CN) .......................... 202410288162.3

(51) Int. Cl.
*F16L 37/086* (2006.01)
*F16L 37/088* (2006.01)

(52) U.S. Cl.
CPC ......... *F16L 37/086* (2013.01); *F16L 37/0885* (2019.08); *F16L 2201/10* (2013.01)

(58) Field of Classification Search
CPC ... F16L 37/086; F16L 37/088; F16L 37/0885; F16L 37/1225; F16L 37/144; F16L 2201/10
See application file for complete search history.

(56) References Cited

U.S. PATENT DOCUMENTS

| | | | | |
|---|---|---|---|---|
| 7,802,822 B2 * | 9/2010 | Poder | .................. | F16L 37/0841 |
| 2018/0328525 A1 * | 11/2018 | Kerin, Jr. | ............ | F16L 37/0885 |
| 2022/0243850 A1 * | 8/2022 | Teasley | ................. | F16L 37/144 |
| 2024/0019063 A1 * | 1/2024 | Cao | ..................... | F16L 37/1225 |

* cited by examiner

*Primary Examiner* — Zachary T Dragicevich
(74) *Attorney, Agent, or Firm* — McAndrews, Held & Malloy, Ltd.

(57) ABSTRACT

A female connector has a female connector housing, a fastening member, and a resilient member. The female connector housing is provided with a slot at a portion thereof which receives a male connector, the slot forming at least one accommodating portion in a circumferential direction of the female connector housing. The fastening member is inserted into the slot and movable between a blocking position and an unblocking position. The resilient member is resiliently connected between the female connector housing and the fastening member, and the resilient member to apply a restoring force to the fastening member to move the fastening member towards the blocking position when the fastening member is in the unblocking position. The fastening member is provided with at least one blocking portion on an inner wall thereof, and the blocking portion cooperates with the accommodating portion to enable the blocking portion to at least partially move through the accommodating portion to enter a channel when the fastening member is in the blocking position, or exit the channel when fastening member is in the unblocking position.

19 Claims, 20 Drawing Sheets

A-A

A-A

B-B

C-C

D-D

E-E

F-F

FEMALE CONNECTOR AND CONNECTOR ASSEMBLY

RELATED APPLICATIONS

The present application claims the benefit of Chinese Patent Application No. 202310450135.7, filed Apr. 24, 2023, and Chinese Patent Application No. 202410288162.3, filed Mar. 13, 2024, each titled "Female Connector and Connector Assembly," the contents of which are hereby incorporated by reference.

TECHNICAL FIELD

The present application relates to the technical field of connector assemblies, and in particular to a quick-connect type connector assembly and a female connector thereof.

BACKGROUND

A quick-connect type connector assembly is a connector that can connect or disconnect pipelines without using tools. A quick-connect type connector assembly generally comprises a male connector and a female connector respectively connected to two pipelines to be connected. A user can directly insert the male connector into the female connector without using external tools to connect the male connector and the female connector as an assembly to allow fluid to flow through pipelines of the connector assembly, such that the two pipelines to be connected are in communication and connection with each other by means of the connector assembly.

SUMMARY OF THE DISCLOSURE

The present disclosure relates generally to a connector assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Figure 1A:
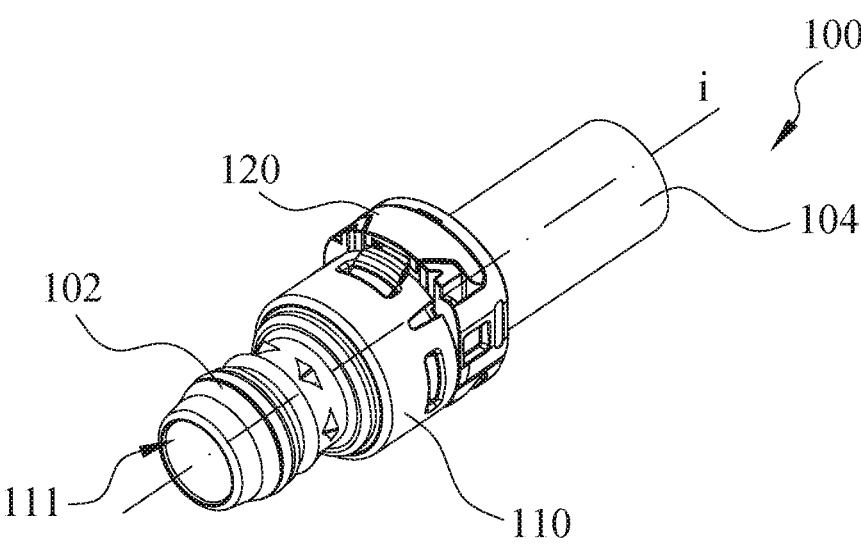
FIG. 1A is a perspective view of a connector assembly according to an embodiment of the present application.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations. Furthermore, it should be understood that some features, structures, or characteristics in one or more embodiments of the present disclosure may be combined appropriately.

In the first aspect of the present application, the present application provides a female connector for receiving and securing a male connector which comprises an outer surface and a groove recessed inwardly from the outer surface and extending circumferentially. The female connector comprises a female connector housing, a fastening member and a resilient member. The female connector housing is cylindrical and provided with a channel. The female connector housing is configured to receive and secure through the channel the male connector inserted into the female connector housing along an axial direction thereof. The female connector housing is provided with a slot at a portion thereof which receives the male connector. The slot forms at least one accommodating portion in the circumferential direction of the female connector housing. The fastening member is inserted into the slot of the female connector housing. The fastening member has a blocking position and an unblocking position. The fastening member is movable within the slot between the blocking position and the unblocking position. The resilient member is resiliently connected between the female connector housing and the fastening member. The resilient member is configured to apply a restoring force to the fastening member to move the fastening member toward the blocking position when the fastening member is in the unblocking position. The fastening member is provided with at least one blocking portion on an inner wall thereof. The blocking portion cooperates with the accommodating portion to enable the blocking portion of the fastening member to at least partially move through the accommodating portion to enter the channel when the fastening member is in the blocking position, or exit the channel when the fastening member is in the unblocking position.

According to the first aspect of the present application, the fastening member and the resilient member are configured such that: when the male connector is inserted into the female connector but has not yet been secured in position, the fastening member is in the unblocking position, the male connector pushes the blocking portion of the fastening member out of the channel to make the fastening member press the resilient member to provide the restoring force; and when the male connector is further inserted into the female connector until secured in position, the fastening member is in the blocking position, the resilient member restores to drive the blocking portion into the channel for insertion into the groove of the male connector, thereby securing the male connector with the female connector.

According to the first aspect of the present application, the female connector is made of non-metallic material.

According to the first aspect of the present application, the female connector is made of plastic material.

According to the first aspect of the present application, the fastening member comprises an operating portion. The operating portion and the blocking portion are provided on opposite two sides of the fastening member. The resilient member is resiliently connected between the female connector housing and the operating portion of the fastening member.

According to the first aspect of the present application, the resilient member provides the restoring force through elastic deformation.

According to the first aspect of the present application, the operating portion of the fastening member is spaced apart from an outer surface of the female connector housing by a certain distance. The resilient member is a resilient sheet having a connecting end and a free end. The resilient sheet is elastically deformable about the connecting end, and the resilient sheet extends obliquely from the connecting end to the free end in a direction substantially along the axial direction.

According to the first aspect of the present application, the resilient sheet has a resilient sheet top portion and a resilient sheet bottom portion. The resilient sheet top portion has a connecting end and is connected to the operating portion of the fastening member. The resilient sheet bottom portion has a free end and correspondingly abuts against the female connector housing.

According to the first aspect of the present application, the female connector housing has a cover extending from the outer surface thereof. A receiving groove is formed between the cover and the outer surface of the female connector housing. The resilient sheet top portion is connected to the operating portion, and the resilient sheet bottom portion cooperates with the receiving groove to be accommodated in the receiving groove.

According to the first aspect of the present application, the resilient sheet has a resilient sheet top portion and a resilient sheet bottom portion. The resilient sheet bottom portion has a connecting end and is connected to the female connector housing, and the resilient sheet top portion has a free end and correspondingly abuts against the operating portion of the fastening member.

According to the first aspect of the present application, the fastening member is annular shaped. The fastening member comprises a bottom portion and a pair of lateral portions. The operating portion, the bottom portion and the pair of lateral portions are connected to form the annular shaped fastening member. The blocking portion is provided on an inner wall of the bottom portion. The pair of lateral portions each is provided with a recess. The outer contour of the recess and the blocking portion match the shape of the outer surface of the male connector to enable the pair of recesses and the blocking portion to give way to the male connector for insertion when the fastening member is in the unblocking position.

According to the first aspect of the present application, the slot comprises an operating portion accommodating opening extending along the circumference of said female connector housing. The operating portion accommodating opening is provided opposite to the accommodating portion. When the fastening member is inserted into the female connector housing, the operating portion of the fastening member is in the operating portion accommodating opening, and the bottom portion is at least partially in the accommodating portion.

According to the first aspect of the present application, at least one of the pair of lateral portions comprises a tab protruding along the axial direction of the female connector housing. The tab is provided with an identifying area for providing an identifier. The female connector housing is provided with at least one window at a corresponding position on its circumference. The window is configured such that when the fastening member is in the blocking position, the window is capable of exposing the identifier, and that when the fastening member is in the unblocking position, the identifier is at least partially covered by the female connector housing.

According to the first aspect of the present application, the operating portion of the fastening member is spaced apart from an outer surface of the female connector housing by a certain distance, and the resilient member is a resilient sheet having a connecting end and a free end. The resilient sheet is elastically deformable about the connecting end, and the resilient sheet extends from the connecting end to the free end in a direction substantially transverse to the axial direction.

According to the first aspect of the present application, the resilient sheet has a resilient sheet top portion and a resilient sheet bottom portion. The resilient sheet top portion has a connecting end and is connected to the operating portion, and the resilient sheet bottom portion has a free end and correspondingly abuts against the female connector housing.

According to the first aspect of the present application, the resilient sheet bottom portion comprises an arc segment protruding towards the female connector housing to abut against the female connector housing.

According to the first aspect of the present application, the female connector housing comprises a body and a connection seat. The connection seat comprises a body connection portion and a fastening member connection portion in the axial direction of the female connector housing. The body connection portion is connected to the body, and the slot is provided on the fastening member connection portion.

According to the first aspect of the present application, the blocking portion is provided with a guiding portion at a front end thereof for cooperating with a guiding portion of the male connector to guide the male connector into the female connector and drive the fastening member from the blocking position to the unblocking position.

According to the first aspect of the present application, the slot extends in the radial direction of the female connector housing. The fastening member moves along the radical direction of the female connector housing with respect to the female connector housing between the blocking position and the unblocking position.

According to the first aspect of the present application, the blocking portion is formed protruding from the inner wall of the fastening member towards the channel.

In a second aspect of the present application, the present application provides a connector assembly comprising a male connector and a female connector. The male connector comprises an outer surface and a groove recessing inwardly from the outer surface and extending circumferentially. The female connector is configured as described in the present application. The male connector is inserted into the female connector along the axial direction of the female connector housing, and the blocking portion is inserted into the groove of the male connector to secure the male connector and the female connector to each other.

Figure 1B:
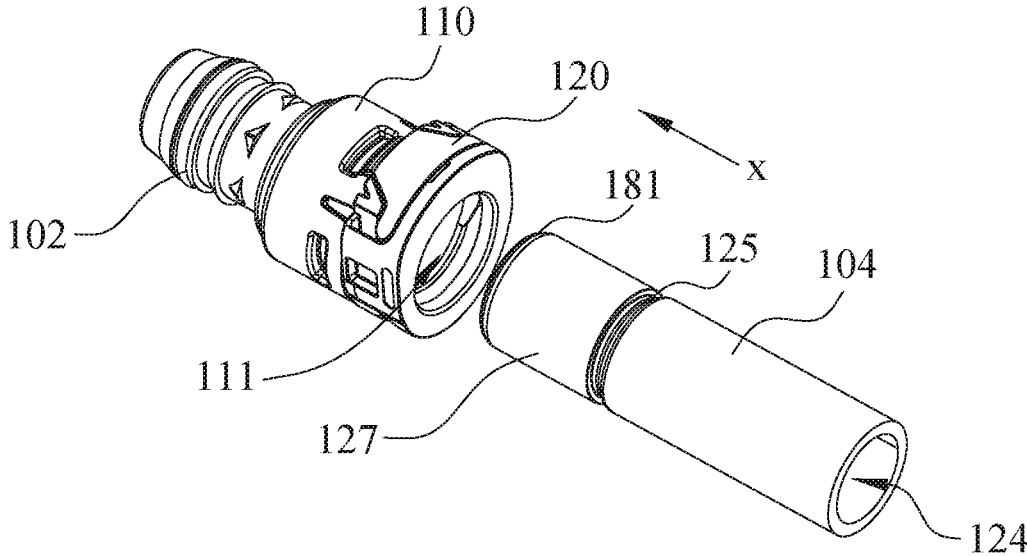
FIG. 1B is an exploded view of the connector assembly in FIG. 1A.

FIG. 1A is a perspective view of a connector assembly 100 using a female connector 102 according to an embodiment of the present application. FIG. 1B is a partially exploded view of the connector assembly 100 in FIG. 1A, in which a male connector 104 is disassembled from the female connector 102. As shown in FIGS. 1A and 1B, the connector assembly 100 comprises the male connector 104 and the female connector 102. The male connector 104 is secured to the female connector 102 in an insertion manner. That is to say, the male connector 104 is partially inserted into the female connector 102, so as to achieve fluid communication between the male connector 104 and the female connector 102.

The male connector 104 is substantially in the shape of a straight cylinder with a circular cross-section, and is provided with a male connector channel 124 within the male connector 104. The male connector channel 124 runs through the male connector 104 to enable the male connector channel 124 to be in communication with the interior of the female connector 102 when the male connector 104 is inserted into the female connector 102 in a direction of arrow x. The male connector 104 is provided with a groove 125 recessed inwardly from an outer surface 127 thereof. The groove 125 is annular in shape and is disposed around the periphery of the male connector 104. The groove 125 is configured to receive a blocking portion 232 (see FIG. 8B) of a fastening member 120 of the female connector 102 to secure and lock the male connector 104 and the female connector 102 to each other. The male connector 104 has a guiding portion 181 (see FIG. 6A) at an end thereof which is configured to be inserted into the female connector 102. The guiding portion 181 cooperates with a guided portion 542 on the fastening member 120 to jointly guide the male connector 104 to be inserted into the fastening member 120 of the female connector 102 and to drive the fastening member 120 to move. In this embodiment, the guiding portion 181 and the guided portion 542 are complementary inclined surfaces. When the male connector 104 is inserted into the female connector 102 by exerting a force, the guiding portion 181 and the guided portion 542 generate on the contact surfaces a component force that drives the fastening member 120 to move. In other embodiments, the guiding portion 181 and the guided portion 542 may have other shapes and configurations.

The female connector 102 is substantially in the shape of a straight cylinder with a circular cross-section. In order to adapt to different application environments, in other embodiments, the female connector 102 may be in the shape of a bent tube or in the shape of a cylinder with other shapes of cross-section. The female connector 102 comprises a female connector housing 110. The inner diameter of the female connector 102 at a proximal end of the female connector housing 110 for receiving the male connector 104 matches the outer diameter of the male connector 104, such that the male connector 104 can fit into the female connector 102. In this embodiment, the female connector housing 110 is provided with an external thread on a distal end thereof such that the female connector 102 can be in threaded connection with an external pipeline (not shown) through the external thread. In other embodiments, the female connector 102 may be connected to an external pipeline in other manners, for example, by means of hoop connection.

The female connector housing 110 defines a channel 111 running therethrough. The female connector 102 receives and secures the male connector 104 through the channel 111. After the male connector 104 is inserted into the female connector 102, the male connector channel 124 is in communication with the channel 111 of the female connector housing 110, such that a pipeline to which the male connector 104 is connected can be in fluid communication with the pipeline to which the female connector 102 is connected. In this embodiment, the female connector 102 and the male connector 104 are substantially in the shapes of coaxially arranged cylinders having a common axis i. For ease of description, in the present application, a direction in which the axis i extends is defined as an axial direction, a direction around the axis i is defined as a circumferential direction, and directions perpendicular to the axis i is defined as radial directions. The male connector 104 is inserted into the channel 111 of the female connector 102 along the axial direction, and both the male connector channel 124 and the channel 111 extend along the axial direction. In some other embodiments, the male connector 104 and the female connector 102 may be in any other shapes, and may also be arranged non-coaxially. In addition, in the present application, along the axial direction of the female connector housing 102, the side where the male connector 104 is located is referred to as front, and the side where the female connector 102 is located is referred to as rear.

Figure 2A:
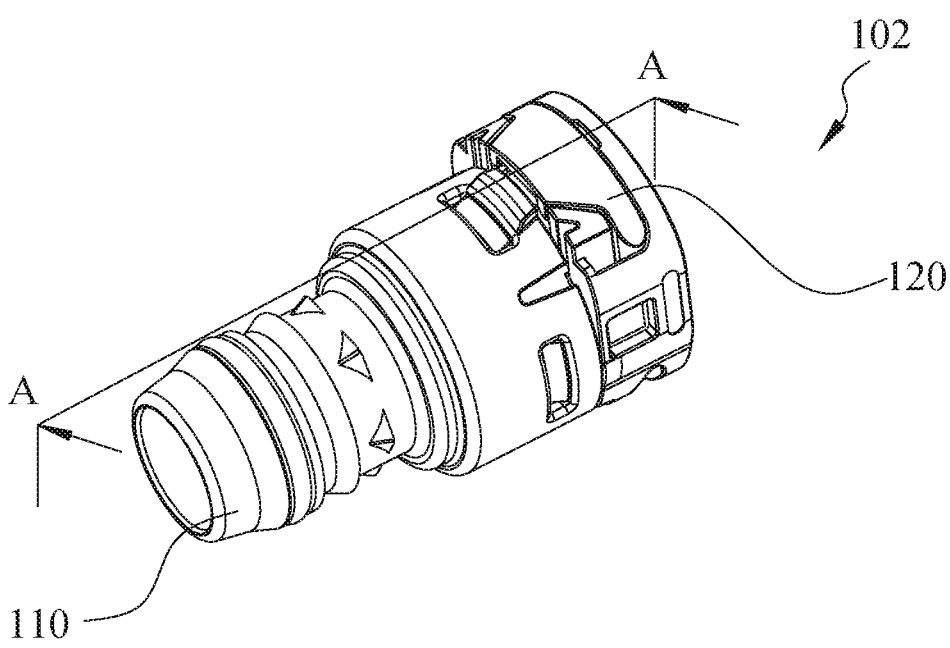
FIG. 2A is a perspective view of the female connector in FIG. 1A showing that a fastening member is in a blocking position.
Figure 2B:
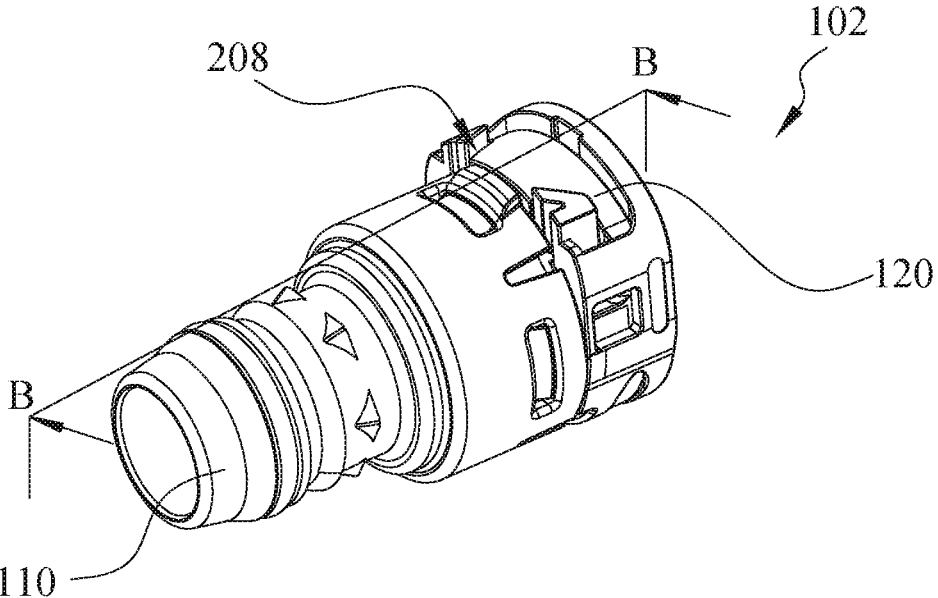
FIG. 2B is a perspective view of the female connector in FIG. 1A showing that the fastening member is in an unblocking position.
Figure 2C:
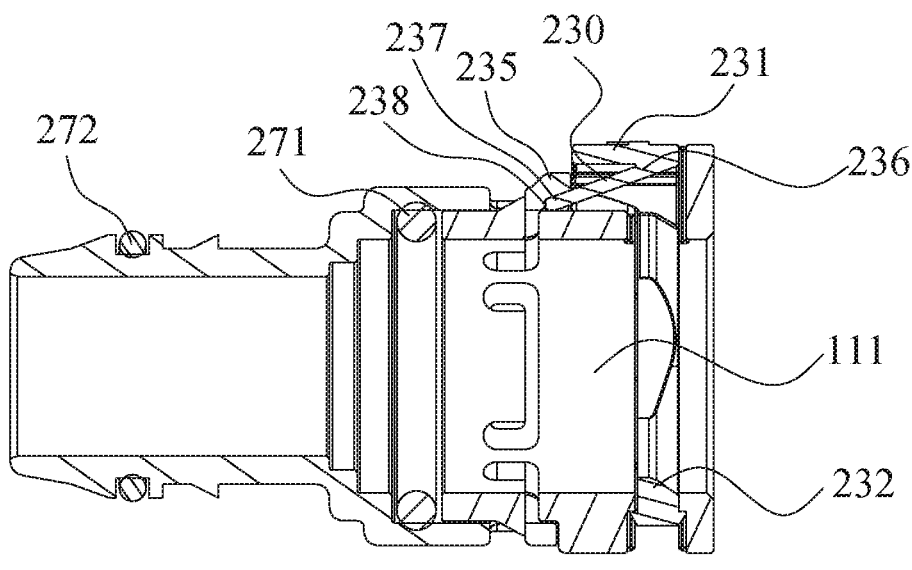
FIG. 2C is a cross-sectional view of the female connector in FIG. 2A along line A-A.
Figure 2D:
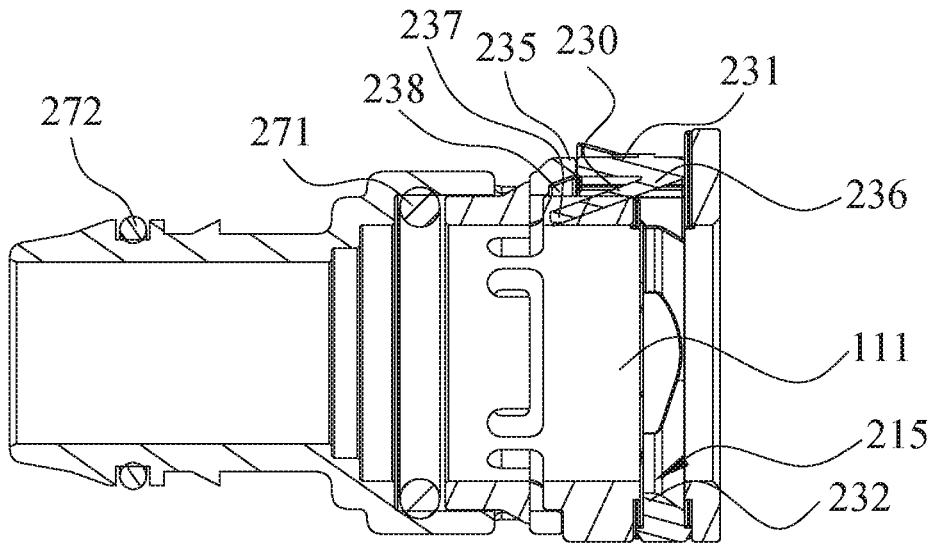
FIG. 2D is a cross-sectional view of the female connector in FIG. 2B along line B-B.
Figure 2E:
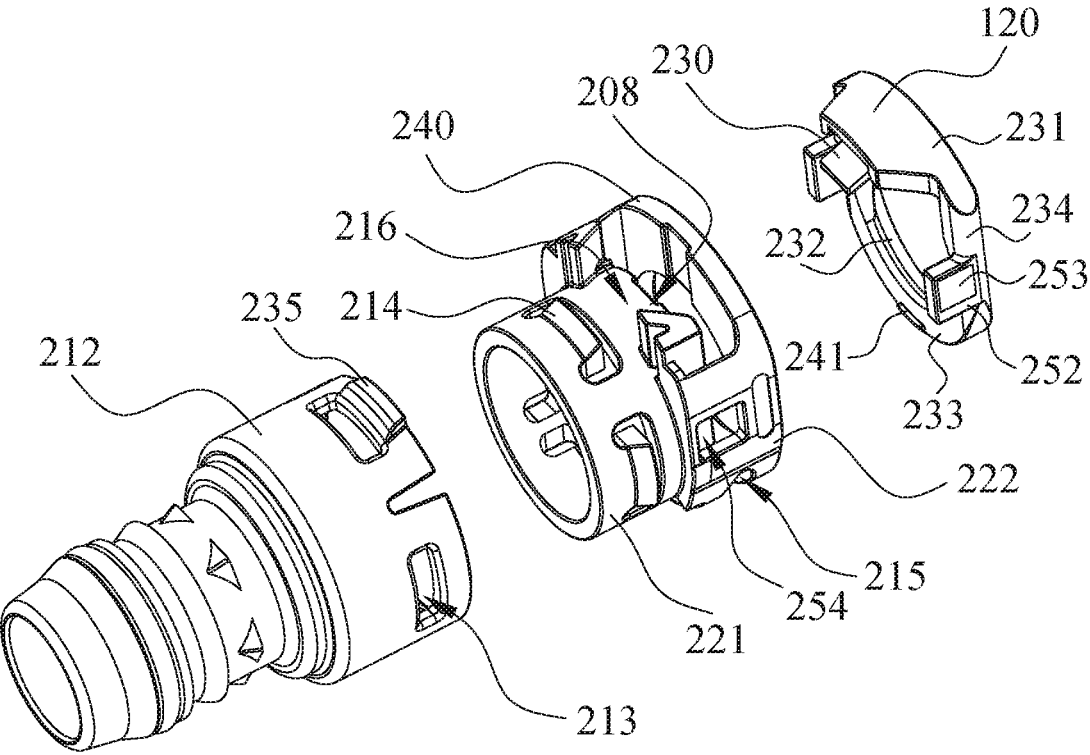
FIG. 2E is an exploded view of the female connector in FIG. 1A.

FIGS. 2A to 2E show a specific structure of the female connector 102. FIGS. 2A and 2B respectively are perspective views of the female connector 102 showing that the fastening member 120 is in a blocking position and the fastening member 120 is in an unblocking position. FIG. 2C is a cross-sectional view of the female connector in FIG. 2A along line A-A. FIG. 2D is a cross-sectional view of the female connector in FIG. 2B along line B-B. FIG. 2E is an exploded view of the female connector 102. As shown in FIGS. 2A to 2E, the female connector 102 comprises the female connector housing 110 and the fastening member 120. The fastening member 120 is connected to a front portion of the female connector housing 110, namely, the housing portion for receiving the male connector 104. In addition, the fastening member 120 is movable relative to the female connector housing 110, and is able to perform different functions when the fastening member 120 moves to different positions.

Specifically, the female connector housing 110 is provided with a slot 208, and the fastening member 120 can be inserted into the slot 208 and is movable in the slot 208 to movably connect the fastening member 120 to the female connector housing 110. The fastening member 120 has the blocking position as shown in FIGS. 2A and 2C and the unblocking position as shown in FIGS. 2B and 2D. When the fastening member 120 is in the blocking position, the blocking portion 232 of the fastening member 120 can move through an accommodating portion 215 and enter the channel 111 to lock the male connector 104 with respect to the female connector 102 after the male connector 104 is in position, so as to keep the female connector and the male connector to be secured to each other. When the fastening member 120 is in the unblocking position, the blocking portion 232 of the fastening member 120 exits the channel 111 to give way to the male connector 104 for insertion, so that the fastening member 120 does not affect the insertion process of the male connector 104. In this embodiment, the slot 208 extends along the radial direction of the female connector housing 110. That is to say, the fastening member 120 is movable relative to the female connector housing 110 along the radial direction of the female connector housing 110 between the blocking position and the unblocking position.

The female connector 102 further comprises a resilient member 230 connected between the female connector housing 110 and the fastening member 120 to apply a restoring force to the fastening member 120. Specifically, when the fastening member 120 is in the blocking position, the resilient member 230 does not exert a force to the fastening member 120. When the fastening member is in the unblocking position, the resilient member 230 exerts a restoring force to the fastening member 120 to move the fastening member 120 towards the blocking position. Thus, when the male connector 104 is inserted into the female connector 102 in position, the restoring force of the resilient member 230 can drive the fastening member 120 to move to the blocking position thereof.

More specifically, the fastening member 120 comprises an operating portion 231, a bottom portion 233 and a pair of lateral portions 234, which are connected to each other to form the fastening member 120. The operating portion 231 and the bottom portion 233 are disposed opposite to each other, and the pair of lateral portions 234 are disposed opposite to each other. When the fastening member 120 is in the blocking position, the operating portion 231 is spaced apart from an outer surface of the female connector housing 110 by a certain distance, while the bottom portion 233 is flush with the outer surface of the female connector housing 110. When the fastening member 120 is in the unblocking position, the operating portion 231 is flush with the outer surface of the female connector housing 110, while the bottom portion 233 is spaced apart from the outer surface of the female connector housing 110 by a certain distance. In this embodiment, the fastening member 120 is annular shaped. In other embodiments, the fastening member 120 may not be annular shaped but may have a notch, as long as the movement of the fastening member 120 is not affected. At least one blocking portion 232 is provided on an inner wall of the bottom portion 233. In this embodiment, the blocking portion 232 is formed as protruding from the inside of the bottom portion 233 towards the channel 111. At least one of the pair of lateral portions 234 comprises a tab 252 protruding along the axial direction of the female connector housing 110, and the tab 252 is provided with an identifying area 253 for providing an identifier. In the present application, the identifier may be an identification code, such as a two-dimensional code or a trademark. At least one protrusion 241 protruding in the axial direction is provided on the bottom portion 233 of the fastening member 120, and the protrusion 241 cooperates with the slot 208 to prevent the fastening member 120 from falling out from top the slot 208.

The female connector housing 110 comprises a body 212 and a connection seat 240. The connection seat 240 comprises, along the axial direction of the female connector housing 110, a fastening member connection portion 222 disposed at the front and a body connection portion 221 disposed at the rear. The fastening member connection portion 222 is provided with the slot 208. The fastening member 120 is inserted into the slot 208 and movable in the slot 208. The slot 208 forms an operating portion accommodating opening 216 and at least one accommodating portion 215 in the circumferential direction of the fastening member connection portion 222, and the operating portion accommodating opening 216 is provided opposite to the at least one accommodating portion 215. When the fastening member 120 is inserted into the slot 208, the operating portion 231 is disposed in the operating portion accommodating opening 216, and the bottom portion 233 is at least partially disposed in the accommodating portion 215. The front portion of the connection seat 240 further comprises at least one window 254 disposed corresponding to the identifying area 253 on the tab 252, such that the window 254 can completely expose the identifier on the identifying area 253 when the fastening member 120 is in the blocking position, and the identifier on the identifying area 253 is at least partially covered by the connection seat 240 when the fastening member 120 is in the unblocking position. When the identifier is a two-dimensional code, an operator can determine whether the two-dimensional code is completely exposed by scanning the two-dimensional code. This helps a customer to verify whether the fastening member 120 is in the blocking position so as to further verify whether the male connector 104 is mounted in position after the male connector 104 is inserted into the female connector 102.

The body connection portion 221 of the connection seat 240 is configured to be connected to the body 212. In this embodiment, the body connection portion 221 is provided with a plurality of snap-fit fasteners 214 on the circumference thereof, while the body 212 is provided with a plurality of windows 213 at the corresponding positions on the circumference thereof, and the snap-fit fasteners 214 fit with the windows 213 to enable the body 212 to be snap-fitted to the connection seat 240. In this embodiment, the female connector housing 110 is configured such that the body 212 and the connection seat 240 connected to each other can facilitate a machining process of the female connector housing 110.

Figures 13A, 13B:
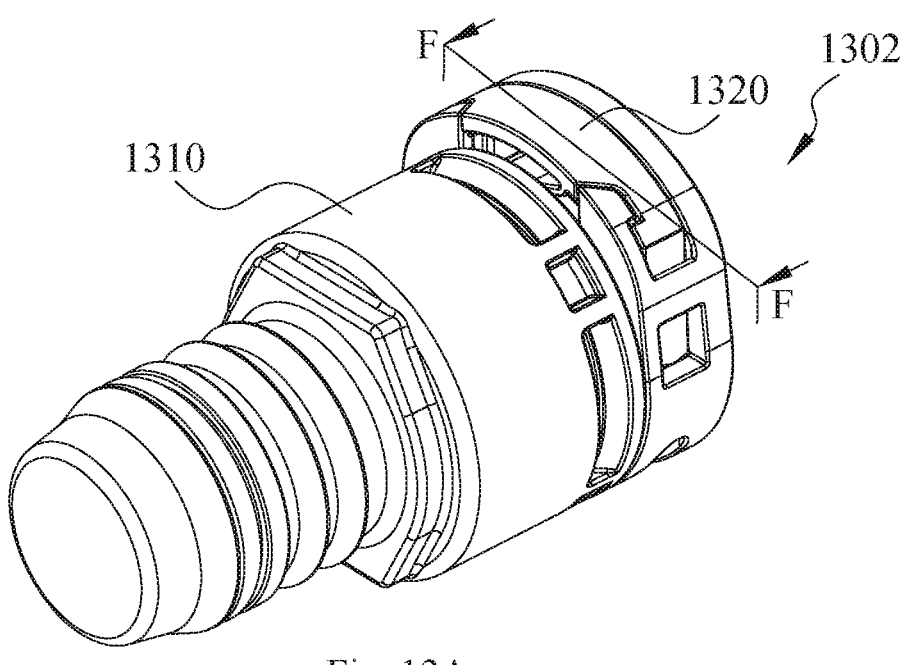
FIG. 13A shows a perspective view of a female connector according to a further embodiment of the present application.
FIG. 13B shows an exploded view of the female connector in FIG. 13A.

The resilient member 230 is connected between an inner surface of the operating portion 231 of the fastening member 120 and the outer surface of the female connector housing 110. In this embodiment, the resilient member 230 is a resilient sheet and provides the restoring force by means of the elastic deformation of the resilient sheet. The resilient sheet has a connecting end and a free end, and the resilient sheet can elastically deform about the connecting end. In this embodiment, the resilient sheet extends from the connecting end to the free end in a direction that is substantially at a certain angle with respect to the axial direction. When the distance between the operating portion 231 and the female connector housing 110 is fixed, the greater the inclination angle of the resilient sheet is, the greater the pressure required for causing the deformation of the resilient sheet; and the greater the length of the resilient sheet is, the smaller the inclination angle of the resilient sheet is required. Those skilled in the art can set the appropriate length of the resilient sheet and the inclination angle between the resilient sheet and the axial direction to keep the pressure of the resilient sheet within an appropriate range while satisfying the distance between the operating portion 231 and the female connector housing 110. Thus, when the fastening member 120 is in the blocking position, the resilient member 230 is in a free state. When the fastening member 120 is in the unblocking position, the resilient member 230 elastically deform by the pressure from the operating portion 231, so as to apply the restoring force to the fastening member 120. In addition, when the fastening member 120 is in the blocking position, the resilient member 230 can further ensure that the fastening member 120 will not move through the slot 208 to fall out from the bottom of the slot 208, so that the resilient member 230 and the protrusion 241 jointly keep the fastening member 120 in the blocking position thereof. In this embodiment, the width of the resilient member 230 which is configured as the resilient sheet is set within a certain range. If the width is too large, the elasticity of the resilient sheet will be insufficient, while if the width is too small, the service life of the resilient sheet will be affected. The resilient sheet has a resilient sheet top portion 236 and a resilient sheet bottom portion 237 in a length direction. In this embodiment, the resilient sheet top portion 236 has a connecting end and is connected to the operating portion 231, and the resilient sheet bottom portion 237 has a free end and correspondingly abuts against the female connector housing 110. As an example, the female connector housing 110 has a cover 235 extending outwardly from the outer surface thereof. A receiving groove 238 is formed between the cover 235 and the outer surface of the female connector housing 110, and has a contour matching the resilient sheet bottom portion 237 to accommodate the resilient sheet bottom portion 237 and to restrict the resilient sheet bottom portion 237 within the receiving groove 238. Thus, when the fastening member 120 is moving, the resilient sheet can only deform in a movement direction of the fastening member 120, but will not deform in other directions to affect the service life of the resilient sheet. Those skilled in the art can understand that, in other embodiments, the resilient sheet can also be configured having other shapes. For example, in the embodiment shown in FIGS. 9A and 9B, the resilient sheet top portion may form the free end and abut against the operating portion 231, while the resilient sheet bottom portion may form the connecting end and be connected to the female connector housing 110. In addition, for example, in the embodiment as shown in FIGS. 13A and 13B, the resilient sheet is disposed to extend transverse to the axial direction.

The female connector 102 further comprises a sealing ring 271 and a sealing ring 272. The sealing ring 271 is disposed in the channel 111 of the female connector 102 and is connected between the body 212 and the connection seat 240. The scaling ring 271 is configured to connect the body 212 and the connection seat 240 in a sealing manner to prevent fluid in the channel 111 from leaking from the windows of the connection seat 240. The sealing ring 272 is disposed on the exterior of the female connector 102 and is configured to provide a sealing effect when the female connector 102 is connected to other pipelines. Those skilled in the art can understand that more sealing rings can be provided according to actual needs to achieve a better sealing effect.

In various embodiments of the present application, both the male connector 104 and the female connector 102 are made of non-metallic materials, so that the connector assembly 100 can be used in corrosive environments such as seawater and deserts. That is to say, the female connector housing 110, the fastening member 120 and the resilient member 230 are made of non-metallic materials such as plastic or rubber materials. In this embodiment, the female connector housing 110, the fastening member 120 and the resilient member 230 are all made of plastic materials by means of a molding process. Thus, the fastening member 120 can ensure the securing strength between the male connector 104 and the female connector 102, and the resilient member 230 can have a certain elasticity. In addition, the molding process facilitates machining.

Figure 3A:
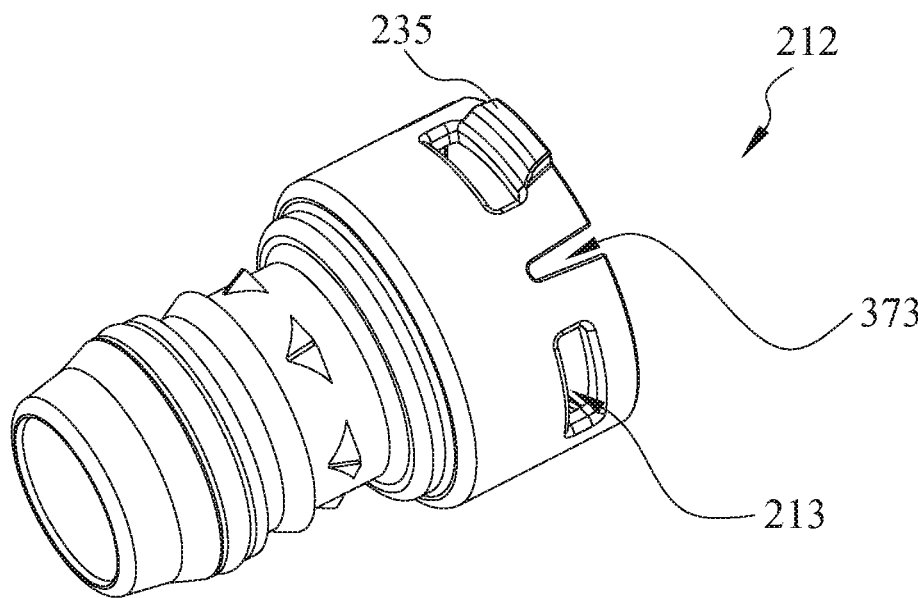
FIGS. 3A and 3B are perspective views of the body in FIG. 1A from two viewing angles.
Figure 3B:
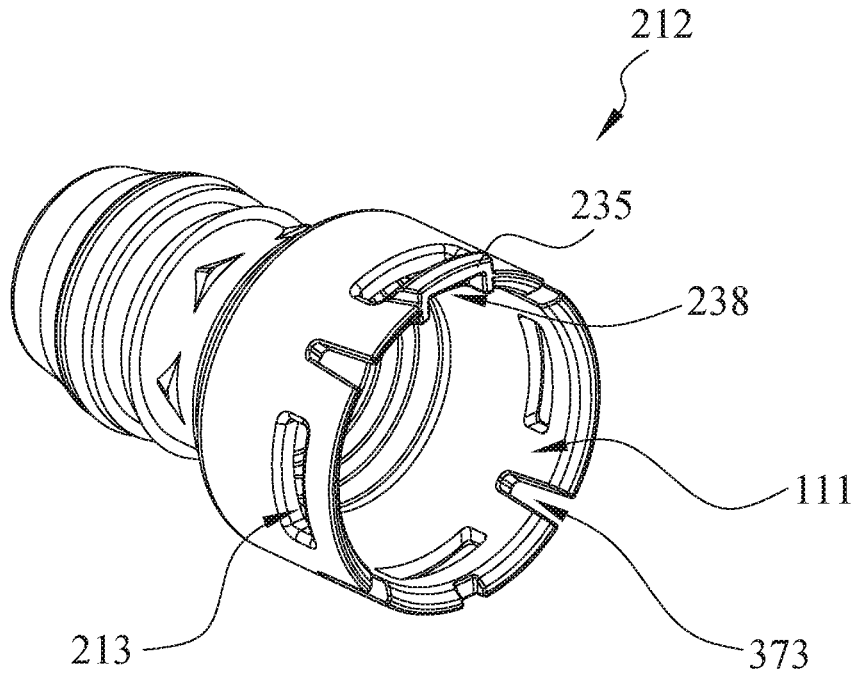

FIGS. 3A and 3B are perspective views of the body 212 of the female connector housing 110 from two viewing angles to show a specific structure of the body 212. As shown in FIGS. 3A and 3B, the interior of the body 212 of the female connector housing 110 forms a part of the channel 111. In this embodiment, the plurality of windows 213 include four windows 213 uniformly disposed on the circumference of the front portion of the body 212, and each window 213 goes through the body 212. A notch 373 is formed between adjacent windows 213. The notches 373 are configured to provide certain deformation spaces when the snap-fit fasteners 214 of the connection seat 240 are snap-fitted in the corresponding windows 213, so that the snap-fit fasteners 214 can be easily snap-fitted in the windows 213. Those skilled in the art can understand that more than four or less than four windows 213 and notches 373 can be provided according to actual needs. The cover 235 is disposed outside the front end of the body 212. In this embodiment, the cover 235 extends from a front edge of one of the windows 213 in a direction outwardly away from an outer surface of the body 212, and is connected on both sides to the outer surface of the body 212. Thus, after the connection seat 240 is connected to the body 212, the outer surface of the connection seat 240 and the cover 235 jointly define the receiving groove 238. The width of the receiving groove 238 is set to match to the width of the resilient sheet, and the height of the receiving groove 238 is set to match the inclination angle of the resilient sheet, such that the receiving groove 238 can exactly accommodate the resilient sheet bottom portion 237.

Figure 4A:
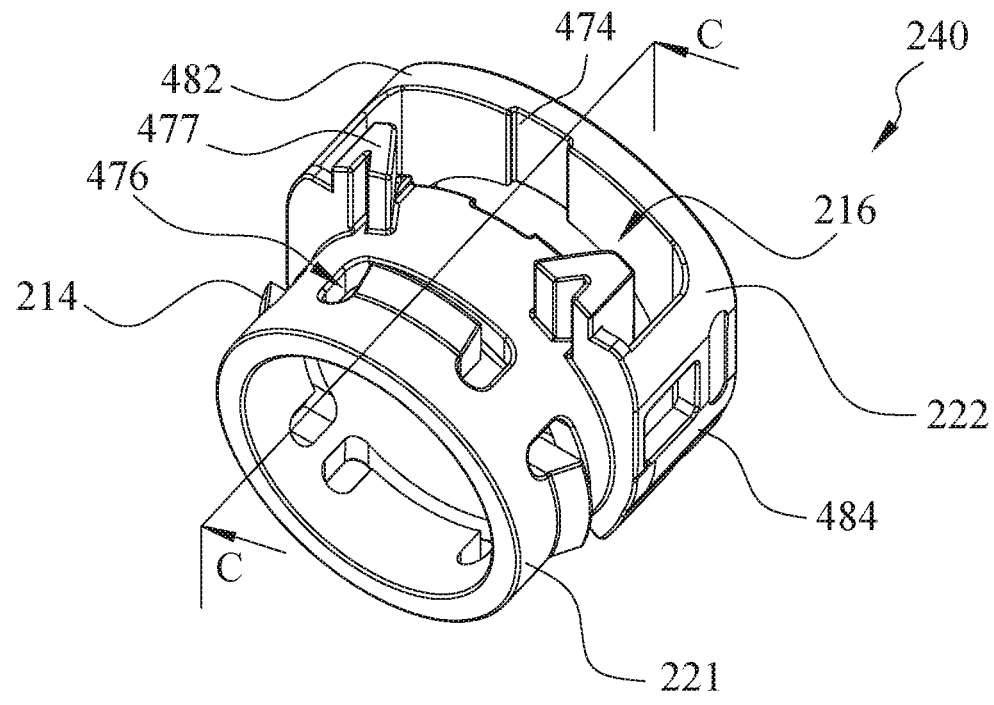
FIGS. 4A and 4B are perspective views of the connection seat in FIG. 1A from two viewing angles.
Figure 4B:
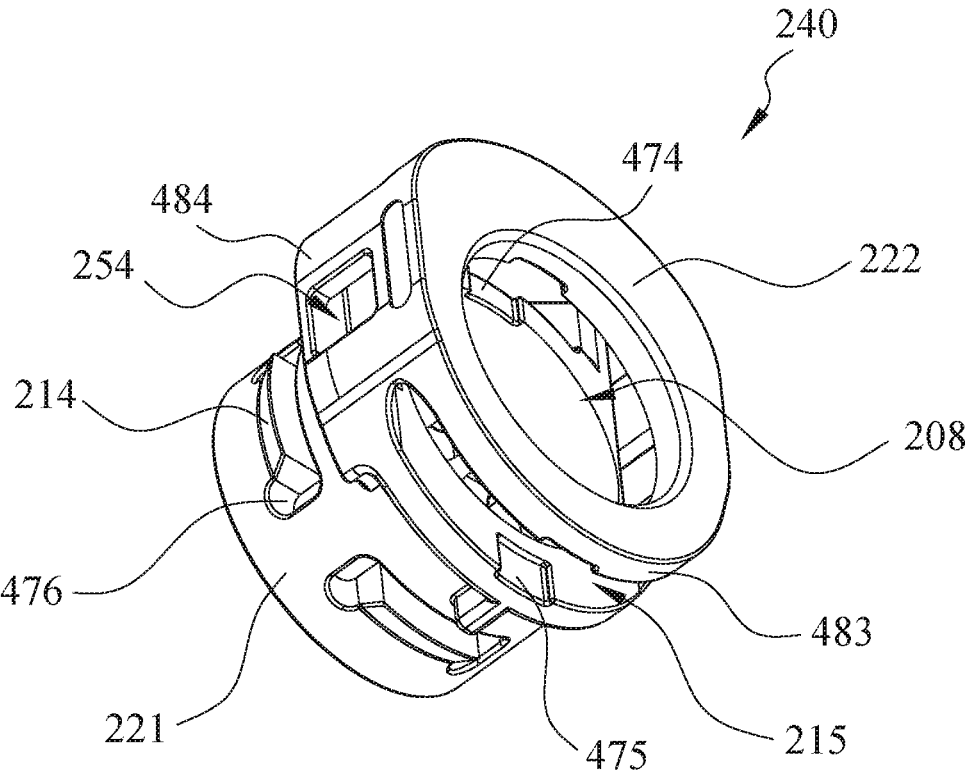
Figure 4C:
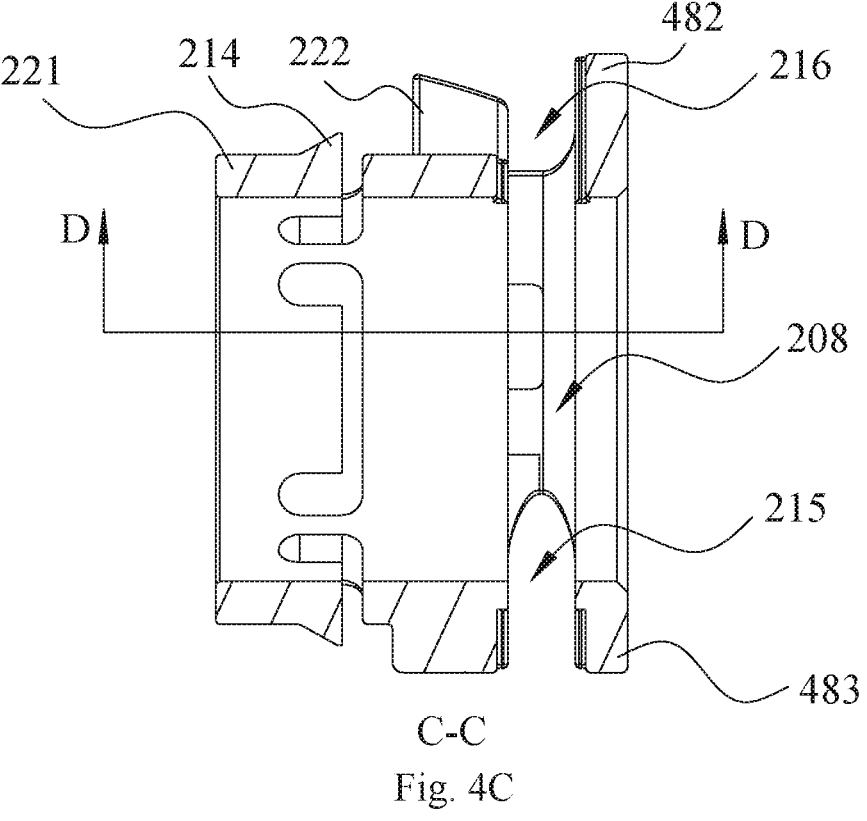
FIG. 4C is a cross-sectional view of the connection seat shown in FIG. 4B along line C-C.
Figure 4D:
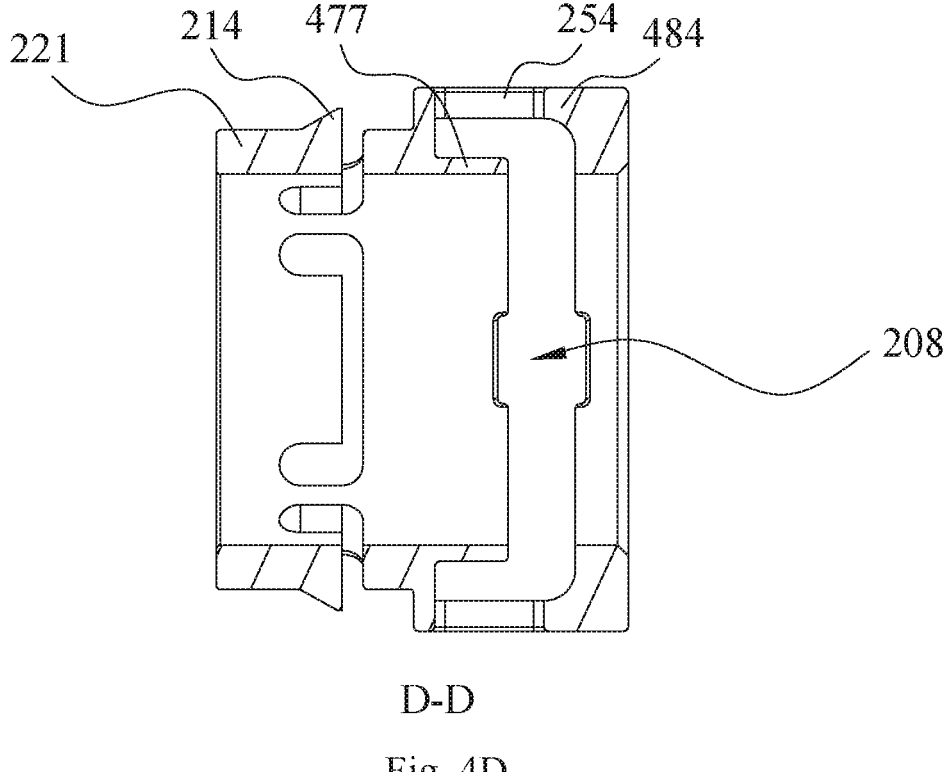
FIG. 4D is a cross-sectional view of the connection seat shown in FIG. 4C along line D-D.

FIGS. 4A to 4D show a specific structure of the connection seat 240 of the female connector housing 110. FIGS. 4A and 4B are perspective views of the connection seat 240 from two viewing angles. FIG. 4C is a cross-sectional view of the connection seat 240 along line C-C. FIG. 4D is a cross-sectional view of connection seat 240 along line D-D. As shown in FIGS. 4A to 4D, the connection seat 240 comprises the body connection portion 221 and the fastening member connection portion 222. The body connection portion 221 is substantially cylindrical, and has an outer diameter substantially equal to the inner diameter of the body 212, such that the body connection portion 221 can be inserted into the body 212. The external dimension of the fastening member connection portion 222 is greater than the inner diameter of the body 212, such that the fastening member connection portion 222 abuts against the front side of the body 212, so as to prevent the connection seat 240 from moving backward relative to the body 212. In this embodiment, an outer surface of the fastening member connection portion 222 is in an unregular cylindrical shape, but an inner surface of the fastening member connection portion 222 is cylindrical, so as to define the channel 111 jointly with the interiors of the body connection portion 221 and the body 212. Specifically, a top portion 482 and a bottom portion 483 of the fastening member connection portion 222 are partially cylindrical, and a pair of lateral portions 484 of the fastening member connection portion 222 are straight walls. A pair of windows 254 are respectively provided in a pair of lateral portions 484. The straight-wall shaped lateral portions 484 are capable to facilitate exposing or covering the identifiers on the identifying areas 253.

Four openings 476 going through the body connection portion 221 are uniformly disposed on the circumference of the body connection portion 221, and a snap-fit fastener 214 is provided in each opening 476. Specifically, a rear end of each snap-fit fastener 214 is connected to a rear edge of the corresponding opening 476, and a front end of each snap-fit fastener 214 is a free end to allow the snap-fit fastener 214 to have a certain elasticity. Each snap-fit fastener 214 protrudes beyond the outer surface of the body connection portion 221 in a direction from the rear end to the front end of the snap-fit fastener 214. Thus, during the course of inserting the body connection portion 221 into the body 212, the snap-fit fasteners 214 can be pressed by the inner wall of the body 212, such that the front ends of the snap-fit fasteners 214 move slightly inwardly. When the snap-fit fasteners 214 reach the corresponding windows 213, the front ends of the snap-fit fasteners 214 return to a position in which the front ends of the snap-fit fasteners 214 protrude beyond the body connection portion 221 and are snap-fitted at the front edges of the windows 213 so as to prevent the connection seat 240 from moving forward with respect to the body 212. Thus, the snap-fit fasteners 214 and the fastening member connection portion 222 jointly fix the position of the connection seat 240 with respect to the body 212.

The slot 208 is provided in the fastening member connection portion 222 and extends from the top portion 482 of the fastening member connection portion 222 to the bottom portion 483 of the fastening member connection portion 222. The slot 208 forms the operating portion accommodating opening 216 on the top portion 482, forms the accommodating portion 215 on the bottom portion 483, and is in communication with the channel 111 at the middle portion between the top portion 482 and the bottom portion 483. In this embodiment, the slot 208 goes through the fastening member connection portion 222 along the radial direction of the female connector housing 110. That is to say, the operating portion accommodating opening 216 and the accommodating portion 215 are each shaped as an opening. In some other embodiments, the slot 208 may not completely go through the fastening member connection portion 222, and one of the operating portion accommodating opening 216 and the accommodating portion 215 is shaped as an opening to facilitate the fastening member 120 to be inserted into the slot 208. In this embodiment, in order to cooperate with the tabs 252 of the fastening member 120, the fastening member connection portion 222 further comprises additional walls 477. The additional walls 477 extend substantially parallel to and is spaced apart from the lateral portions 484 of the fastening member connection portion 222 by a certain distance, such that receiving channels for the insertion of the tabs 252 are formed between the additional walls 477 and the lateral portions 484.

Grooves 474 are provided at the operating portion accommodating opening 216 of the top portion 482 of the fastening member connection portion 222. Grooves 475 are provided at the accommodating portion 215 of the bottom portion 483 of the fastening member connection portion 222. The grooves 474 and the grooves 475 are respectively recessed inwardly along the axial direction from the inner walls of the operating portion accommodating opening 216 and the accommodating portion 215. The grooves 474 and the grooves 475 are configured to cooperate with the protrusions 241 of the fastening member 120. The grooves 474 are configured to give way to the protrusions 241 during the insertion of the fastening member 120 into the slot 208, and the grooves 475 are configured to accommodate the protrusions 241 to prevent the fastening member 120 from falling out from the top portion 482 of the fastening member connection portion 222 after the fastening member is inserted into the slot 208.

Figure 5A:
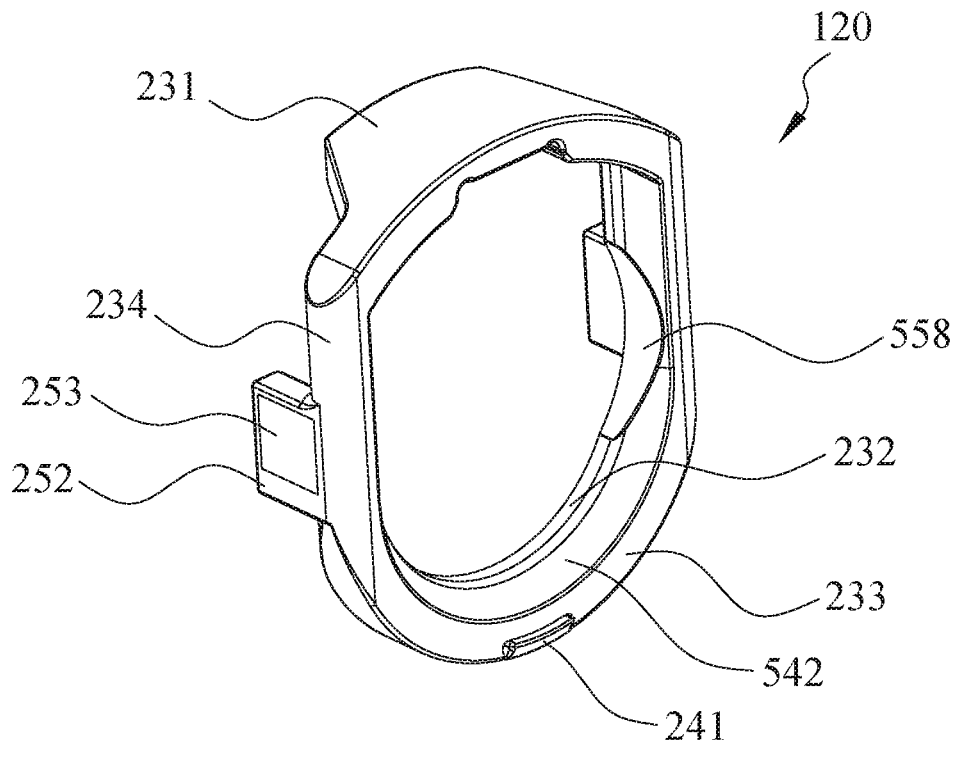
FIGS. 5A and 5B are perspective views of the fastening member in FIG. 1A from two viewing angles.
Figure 5B:
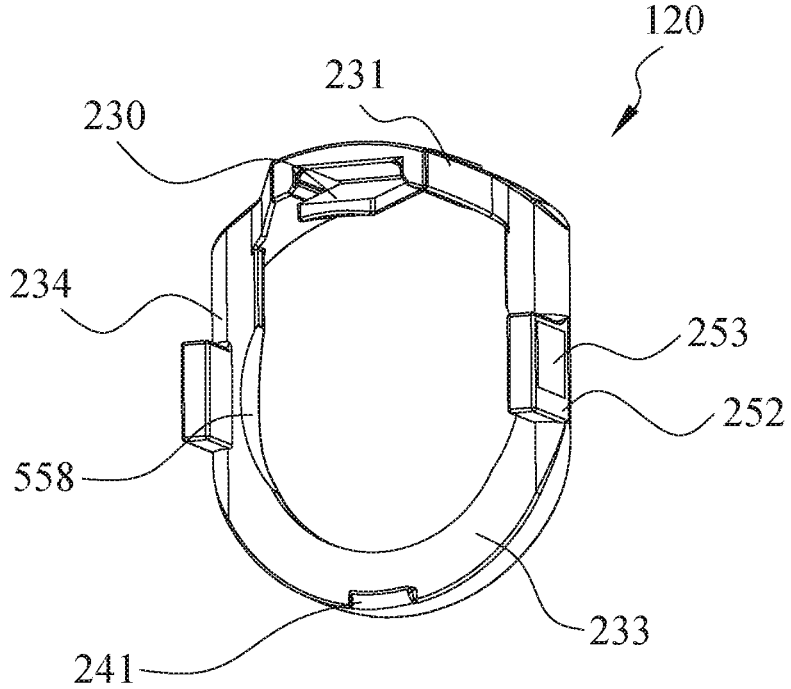
Figure 5C:
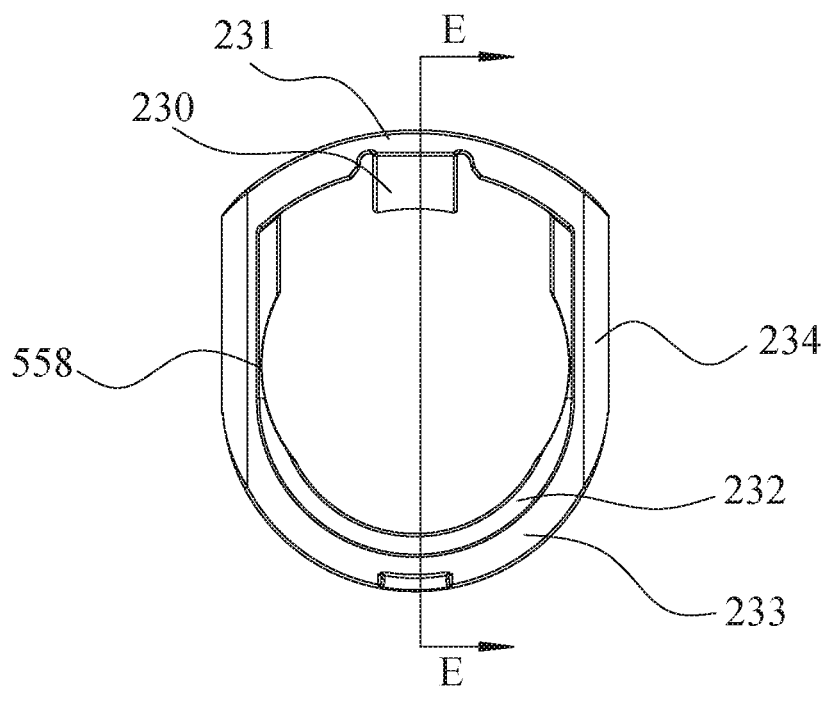
FIG. 5C is a front view of FIG. 5A.
Figure 5D:
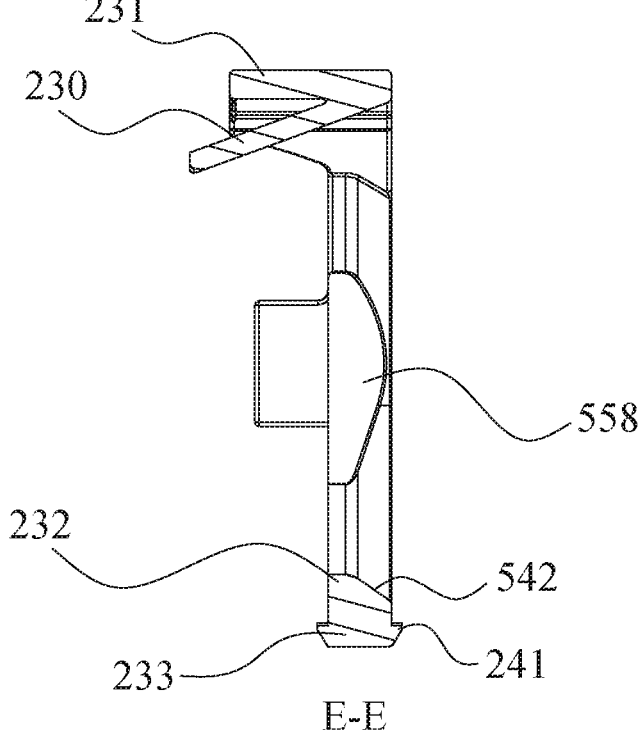
FIG. 5D is a cross-sectional view of the fastening member shown in FIG. 5C along line E-E.

FIGS. 5A to 5D show a specific structure of the fastening member 120. FIGS. 5A and 5B are perspective views of the fastening member 120 from two viewing angles. FIG. 5C is a front view of the fastening member 120 shown in FIG. 5A. FIG. 5D is a cross-sectional view of the fastening member 120 along line E-E. As shown in FIGS. 5A to 5D, a pair of lateral portions 234 of the fastening member 120 are connected substantially vertically between the operating portion 231 and the bottom portion 233 to form the annular shaped fastening member. The fastening member 120 has a certain thickness in the axial direction of the female connector housing 110, so as to ensure the strength of the fastening member 120 made of plastics. In addition, the operating portion 231 at least partially protrudes beyond the bottom portion 233. That is to say, the operating portion 231 has a larger thickness than the bottom portion 233. This makes it more convenient for the operator to press the operating portion 231.

The blocking portion 232 protrudes in the radial direction from the inner wall of the bottom portion 233 of the fastening member 120 towards the channel 111, such that the blocking portion 232 can protrude beyond an inner wall of the fastening member connection portion 222 into the channel 111 so as to function as a block on the insertion path of the male connector 104 when the fastening member 120 is in the blocking position, or can be inserted into the groove 125 of the male connector 104 to secure the connection of the male connector 104 and the female connector 102. In order to improve the secure stability of the male connector 104 and the female connector 102 by the fastening member 120, the blocking portion 232 is configured to extend as long as possible around the circumference of the female connector housing 110. For example, the blocking portion 232 extends around the circumference to engage with the recesses 558 on the lateral portions 234. Those skilled in the art can understand that the protruding of the blocking portion 232 is described with respect to the front end of the bottom portion 233. The guided portion 542 is provided at the front end of the blocking portion 232. In this embodiment, in the direction from the rear to the front, the guided portion 542 is an inclined surface extending from the front end of the blocking portion 232 in a downwardly inclined direction. When the fastening member 120 is in the blocking position, the front end of the guided portion 542 is substantially flush with the inner wall of the fastening member connector 222. As described above, the guiding portion 181 at the end of the male connector 104 is complementary to the guided portion 542, such that during the course of inserting the male connector 104 into the channel 111 from the front to the rear, a downward component force is generated at the contact position of the guiding portion 181 and the guided portion 542 and drives the fastening member 120 to move downwardly in the slot 208.

The pair of lateral portions 234 of the fastening member 120 each is provided with a recess 558 on the respective inner wall thereof. The outer contours of the recesses 558 and the blocking portion 232 match the shape of the outer surface of the male connector 104, such that when the fastening member 120 is in the unblocking position, the fastening member 120 will not block the insertion of the male connector 104, but will give way to the male connector 104 for insertion.

FIGS. 6A, 6B, 7A, 7B, 8A and 8B show a mounting process of inserting the male connector 104 into the female connector 102.

Figure 6A:
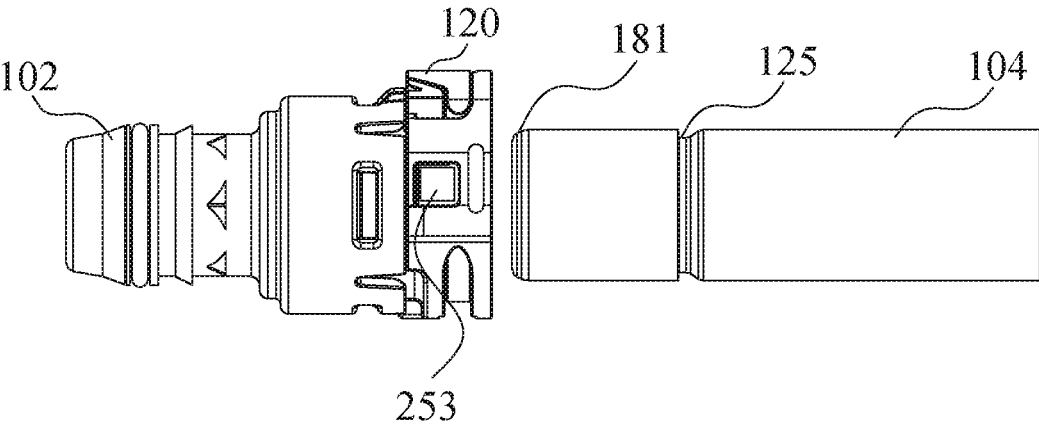
FIGS. 6A and 6B show the fit structures of the connector assembly when the male connector is not inserted.
Figure 6B:
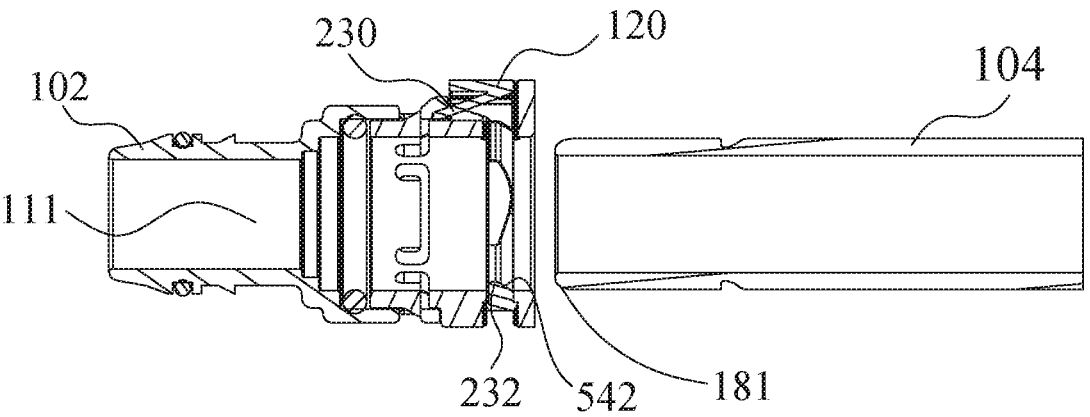

FIGS. 6A and 6B show the fit structures of the connector assembly 100 when the male connector 104 has not yet been inserted into the female connector 102. FIG. 6A shows a side view of the connector assembly 100. FIG. 6B shows an axial cross-sectional view of the connector assembly 100. As shown in FIGS. 6A and 6B, when the male connector 104 has not yet been inserted into the female connector 102, the fastening member 120 is in the blocking position, in which the blocking portion 232 of the fastening member 120 enters the channel 111 through the accommodating portion 215, and the fastening member 120 is at the topmost position in the slot 208. At this moment, the resilient member 230 is in a free state, and the resilient member 230 is connected between the fastening member 120 and the female connector housing 110, preventing the fastening member 120 from moving through the slot 208 and falling out from the bottom. Further, the identifiers on the identifying areas 253 of the tabs 252 are completely exposed.

Figure 7A:
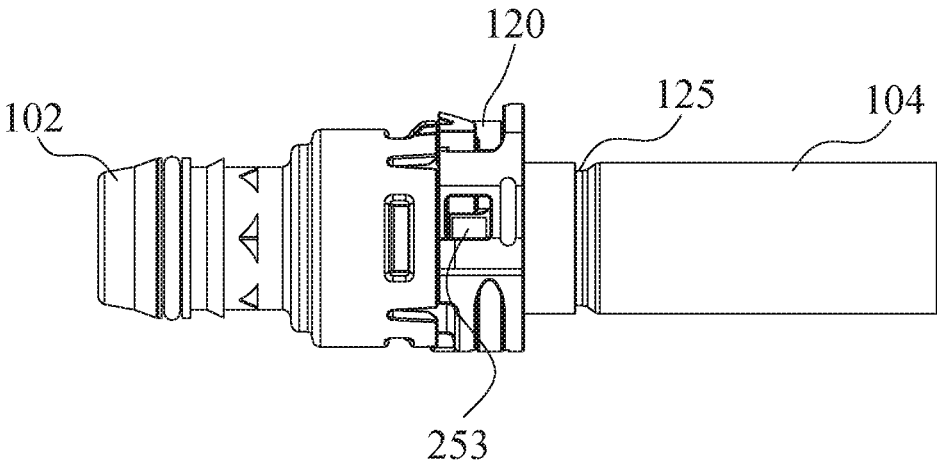
FIGS. 7A and 7B show the fit structures of the connector assembly during the insertion of the male connector.
Figure 7B:
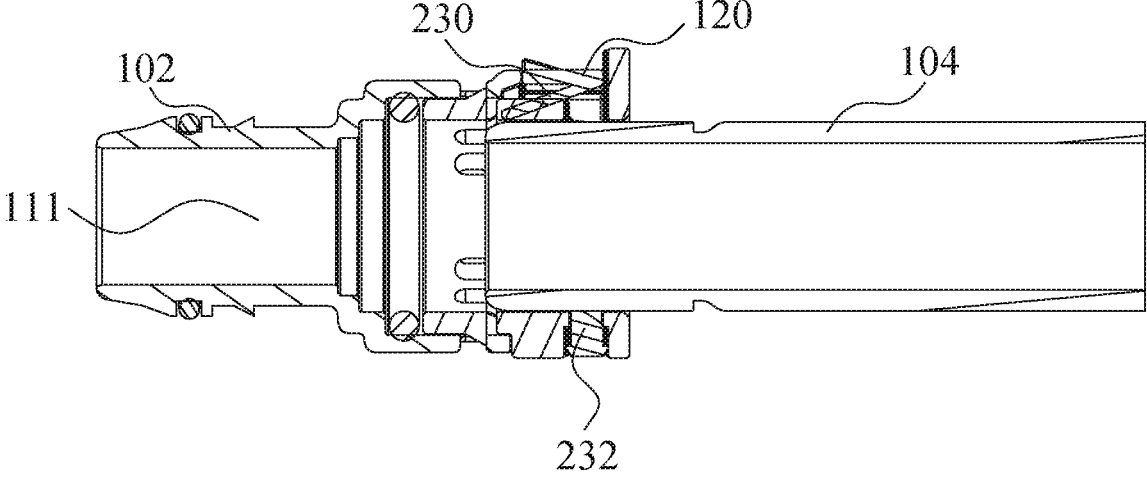

The operator inserts the male connector 104 leftward from a right end of the female connector 102 (that is, backward from the front end of the female connector 102) into the channel 111 of the female connector 102. The male connector 104 moves axially relative to the female connector 102, and the component force is generated after the guiding portion 181 of the male connector 104 comes into contact with the guided portion 542 of the fastening member 120 to drive the fastening member 120 to move downwardly. Due to the action of the component force, the fastening member 120 moves downwardly to the unblocking position, and the blocking portion 232 of the fastening member 120 therefore moves downwardly to exit the channel 111 so as to give way to the male connector 104 for insertion, so that the male connector can reach the position as shown in FIGS. 7A and 7B. It should be noted that during this process, in order to further facilitate the fastening member 120 to move downwardly to the unblocking position, the operator can also press the operating portion 231 to assist in moving the fastening member 120 to the unblocking position in addition to inserting the male connector 104.

FIGS. 7A and 7B show the fit structures of the connector assembly 100 when the male connector 104 is being inserted into the female connector 102 but has not yet been in position. FIG. 7A shows a side view of the connector assembly 100. FIG. 7B shows an axial cross-sectional view of the connector assembly 100. As shown in FIGS. 7A and 7B, the fastening member 120 is in the unblocking position, where the blocking portion 232 of the fastening member 120 exits the channel 111, and the fastening member 120 is at the bottommost position in the slot 208. At this moment, the resilient member 230 is subjected to a downward pressure, and thus elastically deforms (The figures only show the interference state.). The resilient member 230 applies an upward restoring force to the fastening member 120, so that the fastening member 120 tends to move upwardly to the blocking position. However, the blocking portion 232 of the fastening member 120 is blocked by the outer surface 127 of the male connector 104 to prevent the fastening member 120 from returning to the blocking position. In addition, as the fastening member 120 moves downwardly, the identifiers on the identifying areas 253 of the tabs 252 are at least partially covered by the female connector housing 110.

Figure 8A:
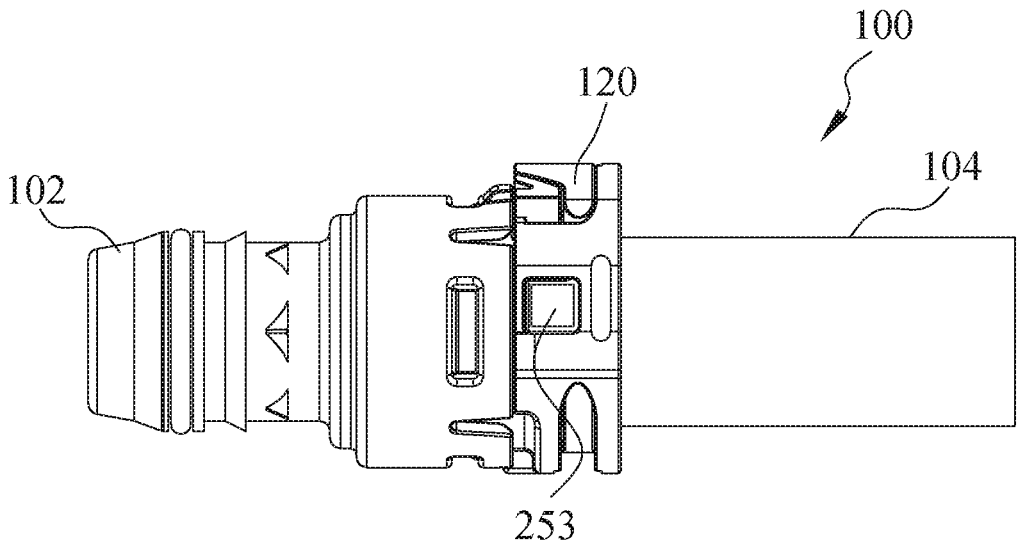
FIGS. 8A and 8B show the fit structures of the connector assembly after the male connector is inserted in position.
Figure 8B:
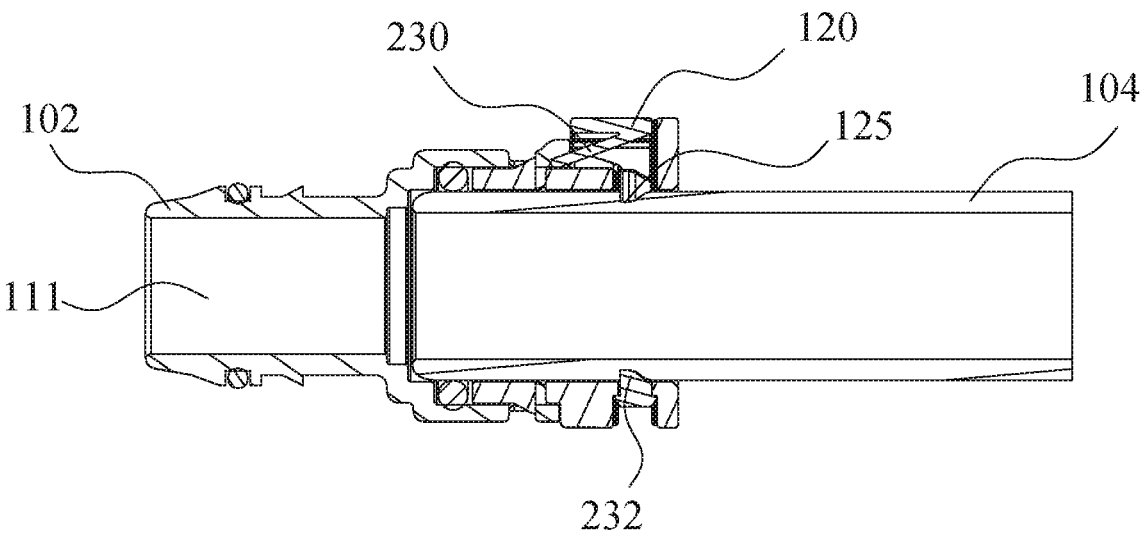

The operator continues to insert the male connector 104 leftward into the channel 111 of the female connector 102 until the groove 125 of the male connector 104 is aligned with the blocking portion 232 of the fastening member 120 and the male connector 104 reaches the position as shown in FIGS. 8A and 8B.

FIGS. 8A and 8B show the fit structures of the connector assembly 100 after the male connector 104 is inserted in position and the male connector 104 is secured to the female connector 102. FIG. 8A shows a side view of the connector assembly 100. FIG. 8B shows an axial cross-sectional view of the connector assembly 100. As shown in FIGS. 8A and 8B, the male connector 104 and the female connector 102 are mounted in position, and the groove 125 of the male connector 104 is aligned with the blocking portion 232 of the fastening member 120. The blocking portion 232 is not blocked by the outer surface 127 of the male connector 104, and thus the fastening member 120 can move upwardly to the blocking position under the action of the restoring force of the resilient member 230. Further, the blocking portion 232 of the fastening member 120 enters the groove 125 of the male connector 104 to clamp the male connector 104 to prevent the male connector 104 from continuing to move along the axial direction, so as to secure the male connector 104 and the female connector 102. At this moment, as the fastening member 120 moves to the blocking position, the identifiers on the identifying areas 253 of the tabs 252 are completely exposed again.

In the present application, the operator can determine whether the fastening member 120 is in the blocking position and in turn determine whether the male connector 104 is inserted in position by visually observing whether the outer surface of the operating portion 231 of the fastening member 120 is flush with the female connector housing 110. In some embodiments, it is also possible to determine whether the male connector 104 is inserted in position on the basis whether the identifiers on the identifying areas 253 are completely exposed. In some embodiments, since the resilient member exerts a restoring force to the fastening member 120 when the fastening member 120 is in the unblocking position, it is also possible to determine whether the fastening member 120 is in the blocking position and in turn to determine whether the male connector 104 is inserted in position based on the amount of resistance when the operator presses the operating portion 231.

When the assembled connector assembly needs to be disassembled, the connector assembly can be disassembled in the sequence as shown in FIGS. 8A and 8B to FIGS. 7A and 7B, and to FIGS. 6A and 6B. Specifically, the operator first presses the operating portion 231 of the fastening member 120 to allow the blocking portion 232 of the fastening member 120 to exit the groove 125 of the male connector 104, and the male connector 104 is then pulled out of the female connector 102.

Figure 9A:
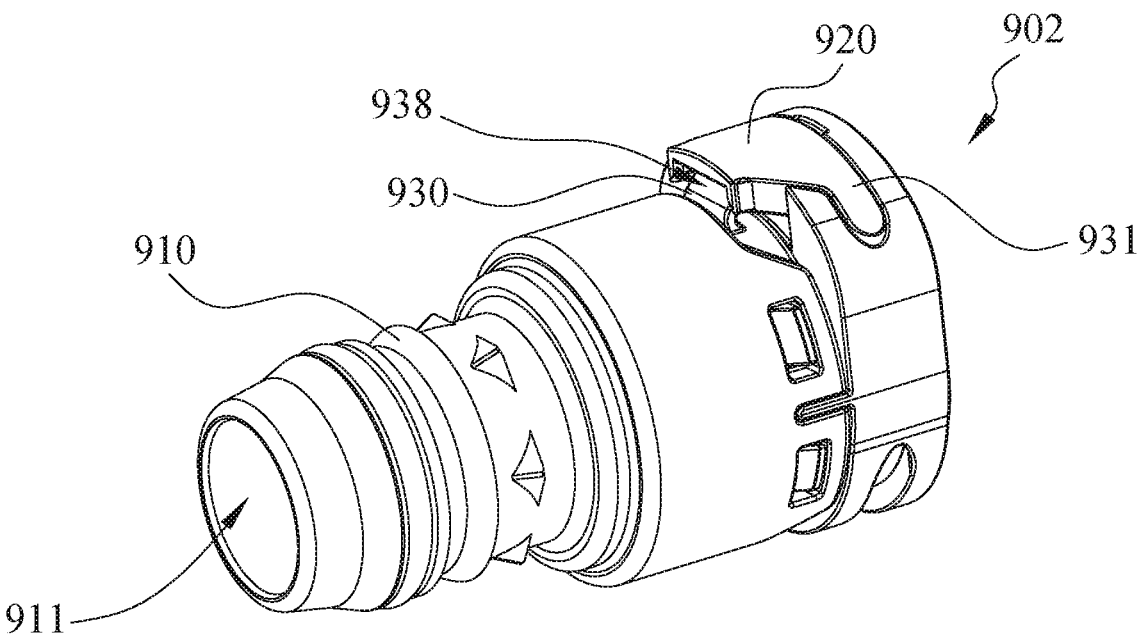
FIG. 9A is a structural perspective view of a female connector according to another embodiment of the present application showing that the fastening member is in a blocking position.
Figure 9B:
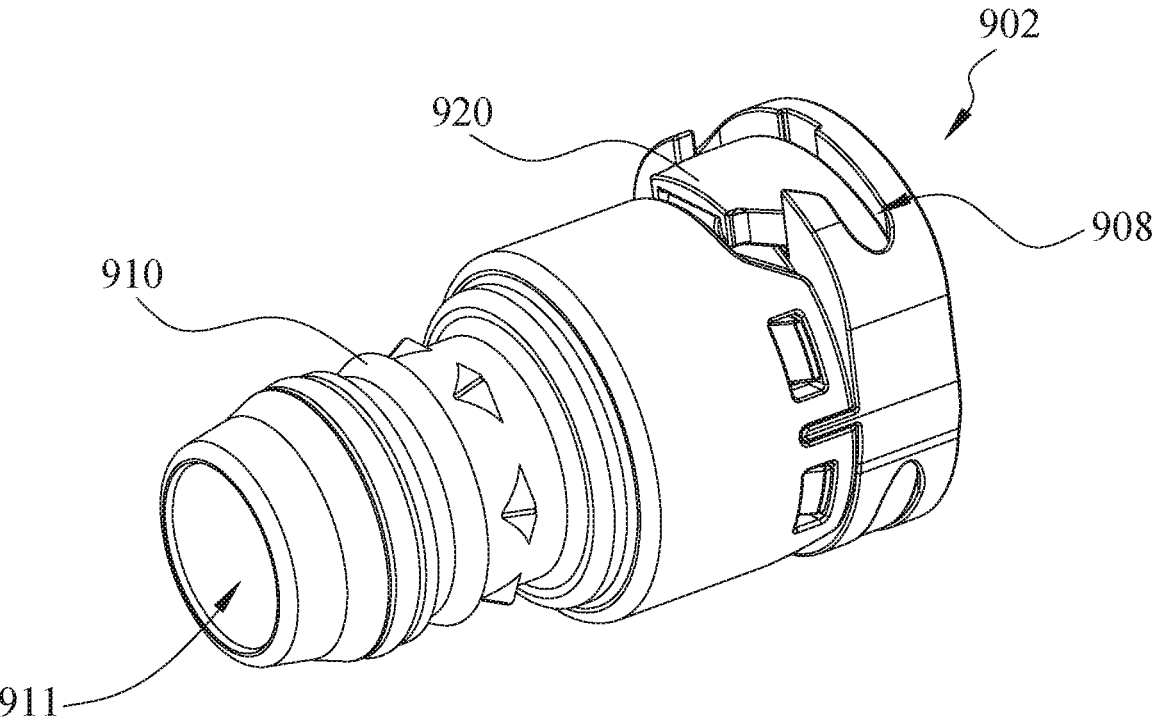
FIG. 9B is a perspective view of the female connector shown in FIG. 9A showing that the fastening member is in an unblocking position.
Figure 9C:
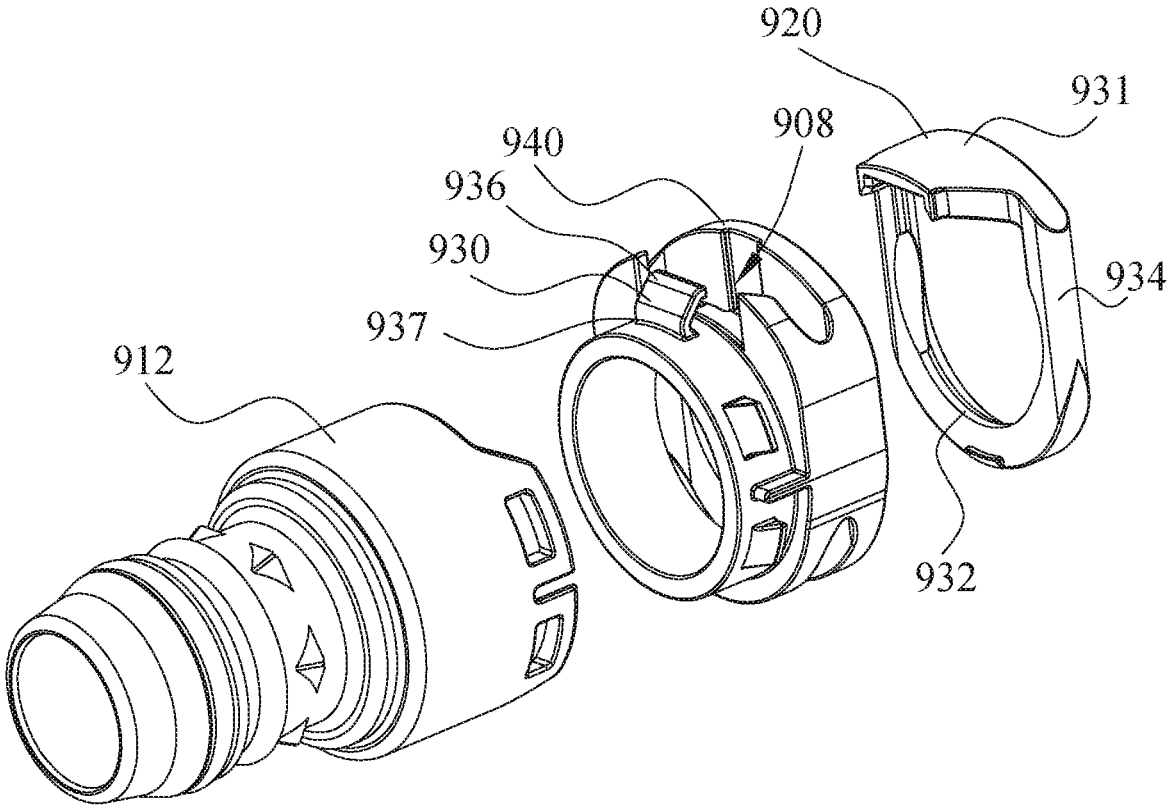
FIG. 9C shows an exploded view of the female connector in FIG. 9A.

FIGS. 9A to 9C show a specific structure of a female connector 902 according to another embodiment of the present application. FIG. 9A shows a structure of the female connector 902 when a fastening member 920 is in a blocking position. FIG. 9B shows a structure of the female connector 902 when the fastening member 920 is in an unblocking position. FIG. 9C shows an exploded view of the female connector 902. As shown in FIGS. 9A to 9C, the structure of the female connector 902 is substantially the same as the structure of the female connector 102, which also comprises a female connector housing 910, a fastening member 920 and a resilient member 930. The female connector housing 910 comprises a body 912 and a connection seat 940 connected to each other. The fastening member 920 is inserted into a slot 908 in the connection seat 940, and is movable in the slot 908 between the blocking position and the unblocking position of the fastening member. The fastening member 920 comprises a blocking portion 932 protruding into a channel 911 when the fastening member 920 is in the blocking position and exiting the channel 911 when the fastening member 920 is in the unblocking position. The structures of the female connector 902 which are substantially the same as those of the female connector 102 will not be repeated herein.

The difference between the female connector 902 and the female connector 102 lies in the connection structure of the resilient member 930. In this embodiment, the resilient member 930 is still a resilient sheet resiliently connected between the fastening member 920 and the female connector housing 910. The resilient sheet also has a connecting end and a free end, the resilient sheet can elastically deform about the connecting end, and the resilient sheet extends from the connecting end to the free end along a direction that is substantially at a certain angle with respect to the axial direction. However, a resilient sheet bottom portion 937 has the connecting end and is connected to the connection seat 940 of the female connector housing 110, while a resilient sheet top portion 936 has the free end and abuts against a lower surface of the fastening member 120. Specifically, the lower surface of the operating portion 931 is recessed upwardly to form a receiving groove 938, and the resilient sheet top portion 936 abuts against the lower surface of the operating portion 931. In this embodiment, due to the limitation by the shape of the operating portion 931, the shape of the receiving groove 938 does not completely match the shape of the resilient sheet top portion 936. In addition, in this embodiment, the lateral portions 934 of the fastening member 920 do not comprise tabs, and the corresponding connection seat 940 does not comprise windows and additional walls.

FIGS. 10A, 10B, 11A, 11B, 12A and 12B show a mounting process of inserting the male connector 104 into the female connector 902, which is similar to that of the connector assembly 100.

Figure 10A:
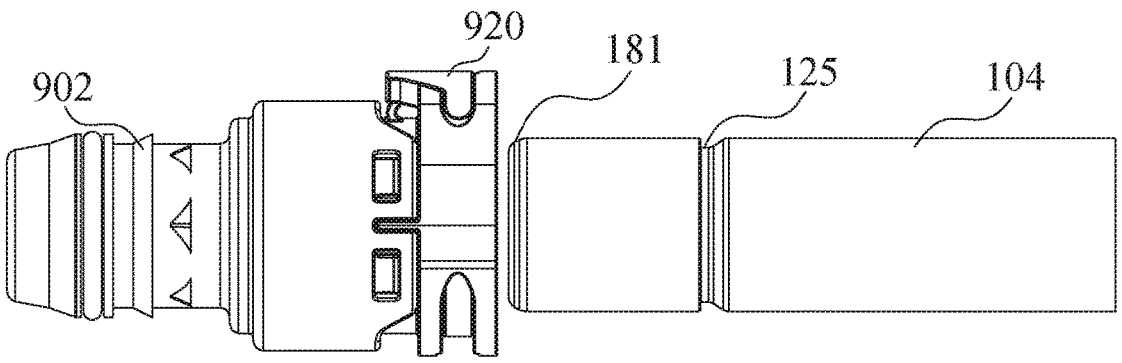
FIGS. 10A and 10B show the fit structures of the connector assembly comprising the female connector shown in FIG. 9A when the male connector is not inserted.
Figure 10B:
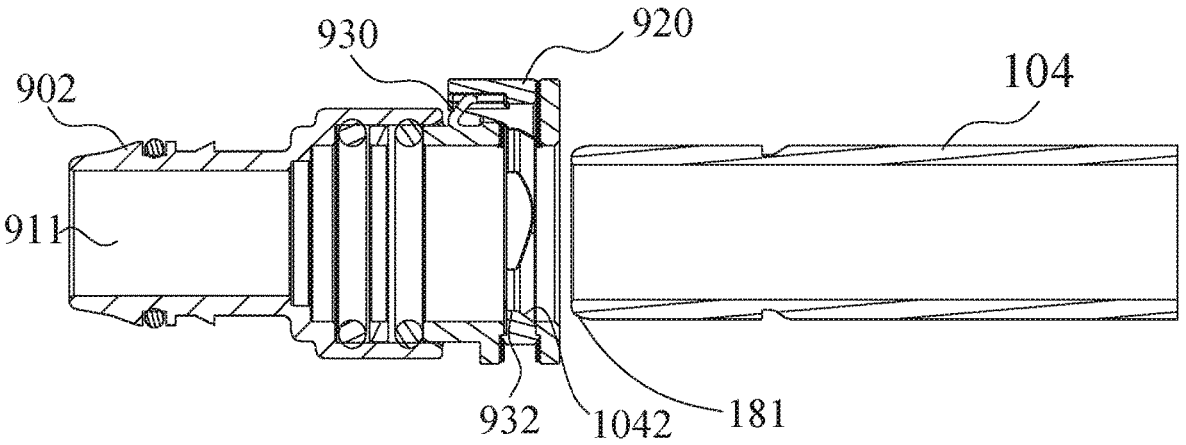

FIGS. 10A and 10B show fit structures of the connector assembly 900 when the male connector 104 has not yet been inserted into the female connector 902. FIG. 10A shows a side view of the connector assembly 900. FIG. 10B shows an axial cross-sectional view of the connector assembly 900. As shown in FIGS. 10A and 10B, when the male connector 104 has not yet been inserted into the female connector 902, the fastening member 920 is in the blocking position in which the blocking portion 932 of the fastening member 120 protrudes into the channel 911, and the fastening member 920 is at the topmost position. At this moment, the resilient member 930 is in a free state.

The operator inserts the male connector 104 leftward from a right end of the female connector 902 into the channel 911 of the female connector 902. The male connector 104 moves axially with respect to the female connector 902, and the component force is generated after the guiding portion 181 of the male connector 104 comes into contact with the guided portion 1042 of the fastening member 920 to drive the fastening member 920 to move downwardly. Under the action of the component force, the fastening member 920 moves downwardly to the unblocking position, the blocking portion 932 of the fastening member 920 thus moves downwardly to exit the channel 911 so as to give way to the male connector 104 for insertion, so that the male connector can reach the positions as shown in FIGS. 11A and 11B.

Figure 11A:
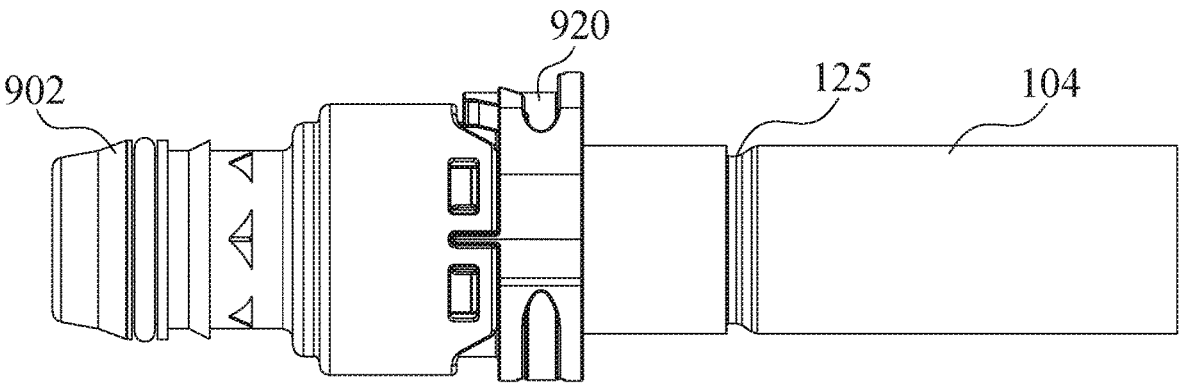
FIGS. 11A and 11B show the fit structures of the connector assembly comprising the female connector shown in FIG. 9A during the insertion of the male connector.
Figure 11B:
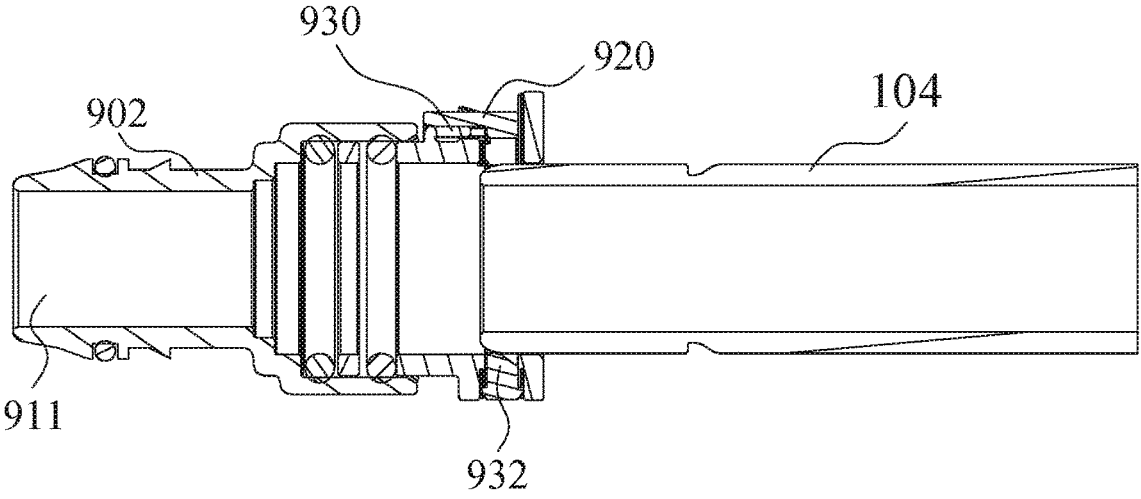

FIGS. 11A and 11B show the fit structures of the connector assembly 900 when the male connector 104 is being inserted into the female connector 902 but has not yet been in position. FIG. 11A shows a side view of the connector assembly 900. FIG. 11B shows an axial cross-sectional view of the connector assembly 900. As shown in FIGS. 11A and 11B, the fastening member 920 is in the unblocking position in which the blocking portion 932 of the fastening member 920 exits the channel 911, and the fastening member 920 is at the bottommost position. At this moment, the resilient member 930 elastically deforms about the connecting end of the resilient sheet because the resilient member 930 is subjected to a downward pressure. The resilient member 930 applies an upward restoring force to the fastening member 920, so that the fastening member 920 tends to move upwardly to the blocking position. However, the blocking portion 932 of the fastening member 920 is blocked by the outer surface 127 of the male connector 104, so that the fastening member 920 cannot return to the blocking position.

Figure 12A:
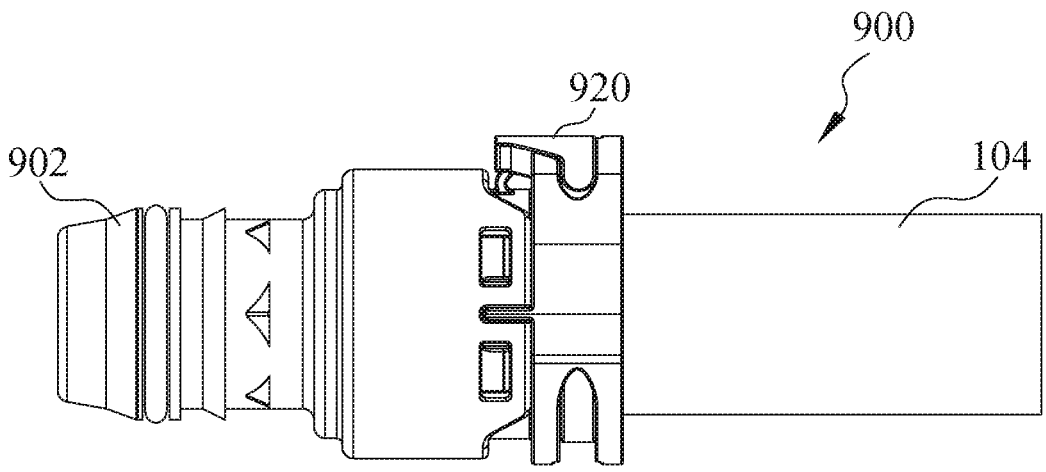
FIGS. 12A and 12B show the fit structures of the connector assembly comprising the female connector shown in FIG. 9A after the male connector is inserted in position.
Figure 12B:
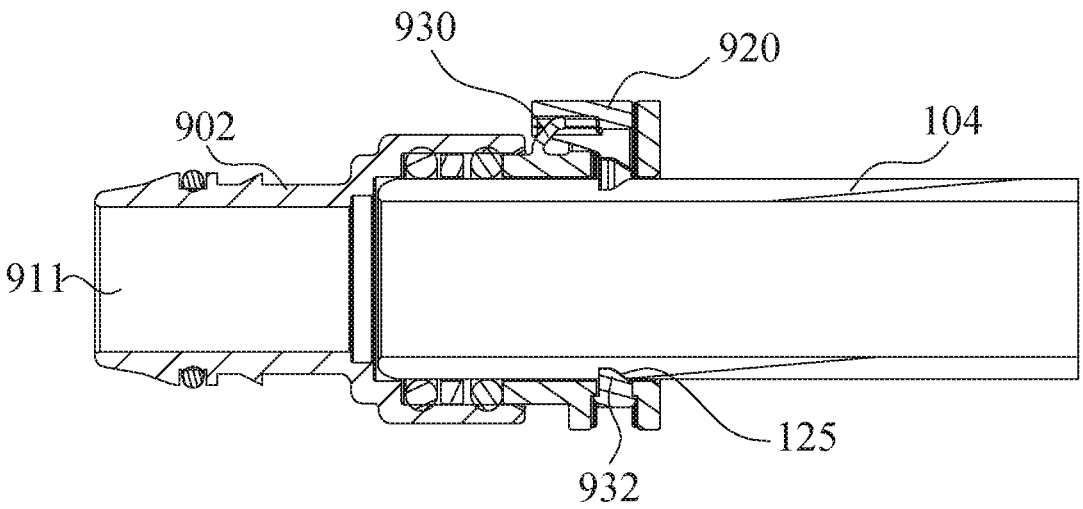

The operator continues to insert the male connector 104 leftward into the channel 911 of the female connector 902 until the groove 125 of the male connector 104 is aligned with the blocking portion 932 of the fastening member 920 and the male connector 104 reaches the positions as shown in FIGS. 12A and 12B.

FIGS. 12A and 12B show the fit structures of the connector assembly 900 when the male connector 104 is inserted in position and the male connector 104 is secured to the female connector 902. FIG. 12A shows a side view of the connector assembly 900. FIG. 12B shows an axial cross-sectional view of the connector assembly 900. As shown in FIGS. 12A and 12B, the male connector 104 and the female connector 902 are mounted in position, and the groove 125 of the male connector 104 is aligned with the blocking portion 932 of the fastening member 920. The blocking portion 932 is not blocked by the outer surface 127 of the male connector 104, and then the fastening member 920 can move upwardly to the blocking position under the action of the restoring force of the resilient member 930. Further, the blocking portion 932 of the fastening member 920 enters the groove 125 of the male connector 104 to clamp the male connector 104 to prevent the male connector 104 from continuing to move along the axial direction, so as to secure the male connector 104 and the female connector 902.

When the assembled connector assembly needs to be disassembled, the connector assembly can be disassembled in the sequence as shown in FIGS. 12A and 12B to FIGS. 11A and 11B and to FIGS. 10A and 10B. Specifically, the operator first presses the operating portion 931 of the fastening member 920 to allow the blocking portion 932 of the fastening member 920 to exit the groove 125 of the male connector 104, and the male connector 104 is then pulled out of the female connector 902.

FIGS. 13A and 13B show a structure of a female connector according to a further embodiment of the present application. FIG. 13A shows a perspective view of the female connector. FIG. 13B shows an exploded view of the female connector. As shown in FIGS. 13A and 13B, the structure of the female connector 1302 is substantially the same as the structure of the female connector 102, which also comprises a female connector housing 1310, a fastening member 1320 and a resilient member 1330. The female connector housing 1310 comprises a body 1312 and a connection seat 1340 connected to each other. The fastening member 1320 is inserted into a slot 1308 in the connection seat 1340, and the fastening member 1320 is movable in the slot 1308 between the blocking position and the unblocking position of the fastening member. The fastening member 1320 comprises a blocking portion 1332. The blocking portion 1332 protrudes into the channel when the fastening member 1320 is in the blocking position, and exits the channel when the fastening member 1320 is in the unblocking position. The structures of the female connector 1302 which are substantially the same as those of the female connector 102 will not be repeated herein.

The difference between the female connector 1302 and the female connector 102 lies in a connection structure of the resilient member 1330. In this embodiment, the resilient member 1330 is still a resilient sheet resiliently connected between the fastening member 1320 and the female connector housing 1310. Further, the resilient sheet also has a connecting end and a free end, and the resilient sheet can elastically deform about the connecting end. However, the resilient sheet extends from the connecting end to the free end in a direction substantially transverse to the axial direction. That is to say, in this embodiment, the resilient sheet does not extend in the direction from the rear to the front, but extends from one lateral portion of the fastening member 1320 to the other lateral portion. In this way, even if the length of the resilient sheet increases, the length of the female connector 1302 in the axial direction does not increase, so that compared with the female connectors 102 and 902, the length of the female connector 1302 in the axial direction is reduced. Therefore, even if the distance between the operating portion 1331 and the female connector housing 1310 is large, the resilient sheet can still meet the pressure requirement for the deformation of the resilient sheet by means of increasing the length of the resilient sheet instead of increasing the inclination angle.

In this embodiment, the fastening member 1320 is further provided with an identifying area 1353 for disposing an identifier, and a corresponding window 1354 for exposing the identifier of the identifying area 1353 is correspondingly provided on the connection seat 1340.

Figure 14:
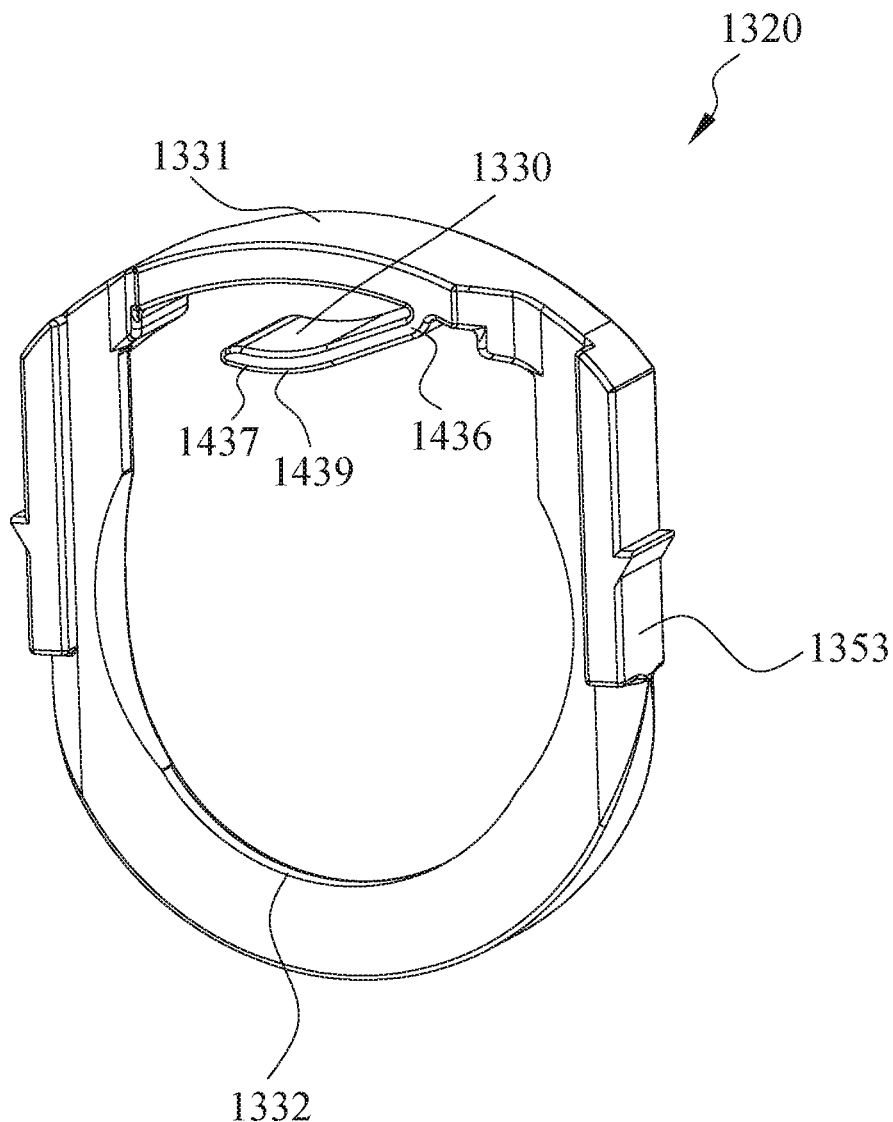
FIG. 14 is a perspective view of the fastening member in FIG. 13B.

FIG. 14 is a perspective view of the fastening member 1320 showing a more specific structure of the fastening member 1320. As shown in FIG. 14, the resilient sheet of the fastening member 1320 has a resilient sheet top portion 1436 and a resilient sheet bottom portion 1437. The resilient sheet top portion 1436 has a connecting end and is connected to the operating portion 1331. The resilient sheet bottom portion 1437 has a free end and is configured to abut against the female connector housing 1310. In addition, in this embodiment, the resilient sheet bottom portion 1437 further comprises a circular arc segment 1439, which protrude towards the female connector housing 1310 to abut against the female connector housing 1310. The resilient sheet bottom portion 1437 having the circular arc segment 1439 can have a larger contact area with the female connector housing 1310, thereby ensuring that the resilient sheet can abut against the female connector housing 1310.

Figure 15A:
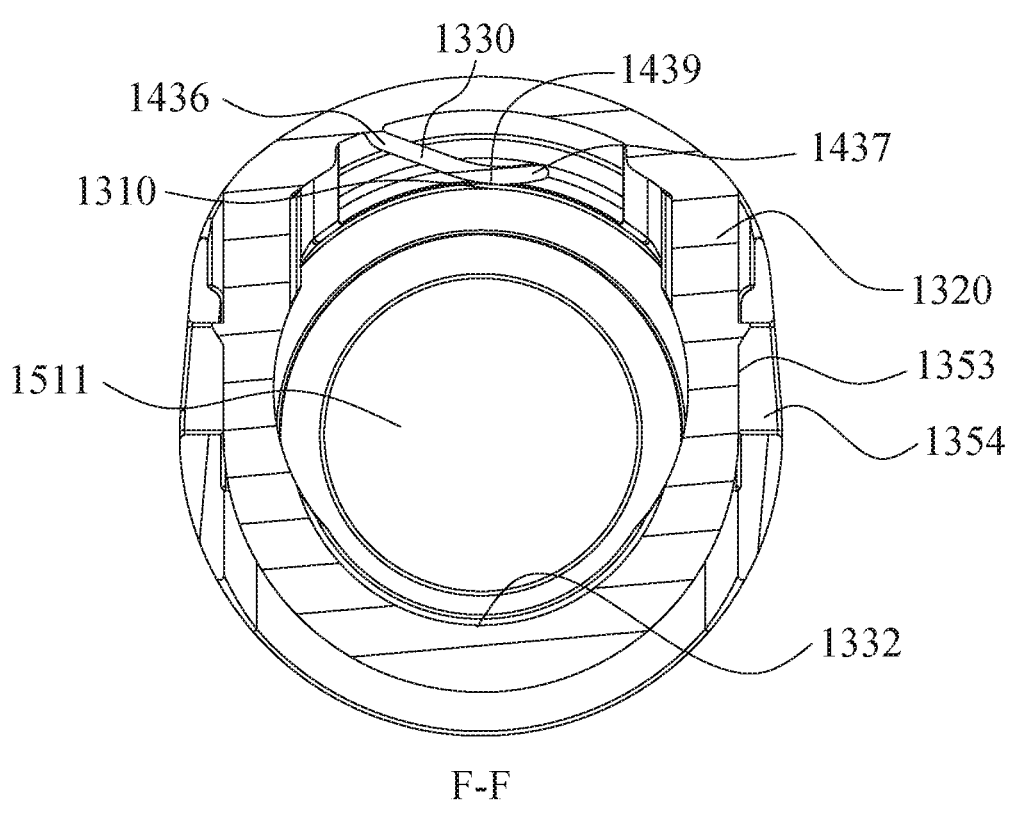
FIG. 15A is a cross-sectional view of the female connector shown in FIG. 13A along line F-F showing that the fastening member is in a blocking position.
Figure 15B:
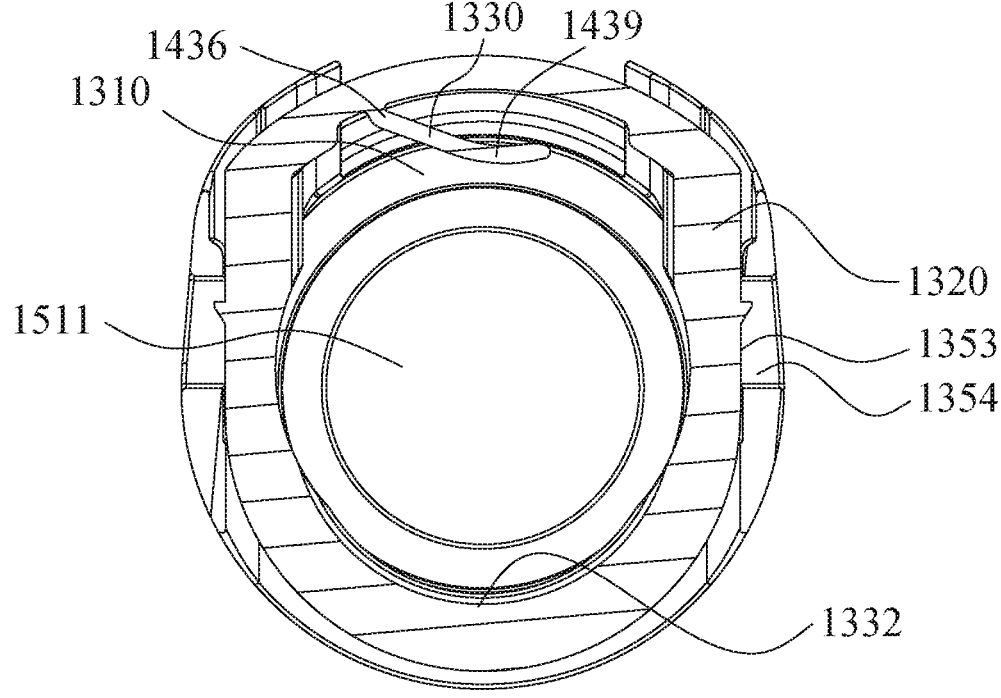
FIG. 15B is a cross-sectional view of the female connector shown in FIG. 13A along line F-F showing that the fastening member is in an unblocking position.

FIG. 15A shows a cross-sectional view of the female connector 1302 along line F-F when the fastening member 1320 is in the blocking position. FIG. 15B shows a cross-sectional view of the female connector 1302 along line F-F when the fastening member 1320 is in the unblocking position. As shown in FIG. 15A, when the fastening member 1320 is in the blocking position, the blocking portion 1332 of the fastening member 1320 protrudes into a channel 1511, and the fastening member 1320 is at the topmost position. At this moment, the resilient member 1330 is in a free state, and the arc segment 1439 of the resilient sheet bottom portion 1437 abuts against the female connector housing 1310. Further, the window 1354 completely exposes the identifier disposed on the identifying area 1353.

When the operator inserts the male connector into the channel 1511 of the female connector 1302 or presses the operating portion 1331 of the fastening member 1320, the fastening member 1320 moves to the unblocking position as shown in FIG. 15B.

As shown in FIG. 15B, when the fastening member 1320 is in the unblocking position, the blocking portion 1332 of the fastening member 1320 exits the channel 1511, and the fastening member 1320 is at the bottommost position. At this moment, the resilient member 1330 elastically deforms about the connecting end of the resilient sheet since the resilient member 1330 is subjected to a downward pressure (The figures only show the interference state.). The resilient member 1330 applies an upward restoring force to the fastening member 1320, so that the fastening member 1320 tends to move upwardly to the blocking position. Further, as the fastening member 1320 moves downwardly, the identifier set on the identifying area 1353 is at least partially covered and cannot be completely exposed in the window 1354.

Since the connector assembly according to the present application is made of non-metallic material such as plastics, the connector assembly of the present application can be used in corrosive environments such as seawater or deserts. In addition, the fastening member of the female connector of the present application is configured to enter or exit the channel to perform the function of securing the male connector, and the resilient member of the female connector is configured to provide elasticity, thus removing the requirement on fastening members made of plastics of having both strength and elasticity. In some embodiments, the resilient member in the shape of a resilient sheet has a small structure and only deforms during the movement of the fastening member, and also has a small deformation amplitude. There- fore, the resilient member is allowed to be made of plastic materials. Further, the fastening member does not need to deform separately, and the annular shape can further ensure the strength of the fastening member, so that the structure is stable when the male connector is secured to the female connector by means of the fastening member.

In addition, in the connector assembly of the present application, it is possible to indicate whether the male connector and the female connector are inserted in position based on the position of the fastening member, the exposure extent of the identifier, or the hand feeling of pressing the operating portion. In some embodiments, the operator can determine the position of the male connector with respect to the female connector directly by visually observing whether the fastening member is flush with the outer surface of the female connector housing. In some embodiments, the iden- tifier is a two-dimensional code, and the operator can determine whether the identifier is completely exposed by scanning the two-dimensional code. In some embodiments, the operator can determine whether the resilient member deforms based on the resistance size when pressing the operating portion, so as to determine the position of the fastening member and in turn determine whether the male connector and the female connector are inserted in position.

Although the present disclosure is described with refer- ence to the examples of embodiments outlined above, vari- ous alternatives, modifications, variations, improvements and/or substantial equivalents, which are known or antici- pated at present or to be anticipated before long, may be obvious to those of at least ordinary skill in the art. Fur- thermore, the technical effects and/or technical problems described in this description are exemplary rather than limiting. Therefore, the disclosure in this description may be used to solve other technical problems and have other technical effects and/or may solve other technical problems. Accordingly, the examples of the embodiments of the pres- ent disclosure as set forth above are intended to be illustra- tive rather than limiting. Various changes may be made without departing from the spirit or scope of the present disclosure. Therefore, the present disclosure is intended to embrace all known or earlier developed alternatives, modi- fications, variations, improvements and/or substantial equivalents.

What is claimed is:

1. A female connector for receiving and securing a male connector, the male connector comprising an outer surface and a groove recessed inwardly from the outer surface and extending circumferentially, the female connector compris- ing:

a female connector housing being cylindrical and pro- vided with a channel, the female connector housing being configured to receive and secure through the channel the male connector inserted into the female connector housing along an axial direction thereof, wherein the female connector housing is provided with a slot at a portion thereof which receives the male connector, the slot forming an accommodating portion in a circumferential direction of the female connector housing;

a fastening member inserted into the slot of the female connector housing, wherein the fastening member has a blocking position and an unblocking position, and wherein the fasten- ing member is movable within the slot between the blocking position and the unblocking position; and a resilient member resiliently connected between the female connector housing and the fastening member, wherein the resilient member is configured to apply a restoring force to the fastening member to move the fastening member toward the blocking position when the fastening member is in the unblocking position, wherein the resilient member provides the restoring force through elastic deformation;

wherein the fastening member is provided with a blocking portion on an inner wall thereof, and wherein the blocking portion cooperates with the accommodating portion to enable the blocking por- tion of the fastening member to at least partially move through the accommodating portion to enter the channel when the fastening member is in the blocking position, or exit the channel when the fastening member is in the unblocking position.

2. The female connector of claim 1, wherein the fastening member and the resilient member are configured such that:

when the male connector is inserted into the female connector but has not yet been secured in position, the fastening member is in the unblocking position, the male connector pushes the blocking portion of the fastening member out of the channel to make the fastening member press the resilient member to provide the restoring force; and when the male connector is further inserted into the female connector until secured in position, the fasten- ing member is in the blocking position, the resilient member restores to drive the blocking portion into the channel for insertion into the groove of the male connector, thereby securing the male connector with the female connector.

3. The female connector of claim 2, wherein the female connector is made of non-metallic material.

4. The female connector of claim 3, wherein the female connector is made of plastic material.

5. The female connector of claim 1, wherein the fastening member comprises an operating portion, the operating por- tion and the blocking portion being provided on opposite two sides of the fastening member; and wherein the resilient member is resiliently connected between the female connector housing and the operat- ing portion of the fastening member.

6. The female connector of claim 5, wherein the operating portion of the fastening member is spaced apart from an outer surface of the female connector housing by a certain distance, the resilient member being a resilient sheet having a connecting end and a free end, the resilient sheet being elastically deformable about the connecting end, and the resilient sheet extending obliquely from the connecting end to the free end in a direction substantially along the axial direction.

7. The female connector of claim 6, wherein the resilient sheet has a resilient sheet top portion and a resilient sheet bottom portion, the resilient sheet top portion having a connecting end and being connected to the operating portion of the fastening member, and the resilient sheet bottom portion having a free end and correspondingly abutting against the female connector housing.

8. The female connector of claim 7, wherein the female connector housing has a cover extending from the outer surface thereof, a receiving groove being formed between the cover and the outer surface of the female connector housing; and the resilient sheet top portion is connected to the operating portion, and the resilient sheet bottom portion cooperates with the receiving groove to be accommodated in the receiving groove.

9. The female connector of claim 6, wherein the resilient sheet has a resilient sheet top portion and a resilient sheet bottom portion, the resilient sheet bottom portion having a connecting end and being connected to the female connector housing, and the resilient sheet top portion having a free end and correspondingly abutting against the operating portion of the fastening member.

10. The female connector of claim 5, wherein the fastening member is an annular shaped fastening member, the fastening member comprising a bottom portion and a pair of lateral portions, the operating portion, the bottom portion and the pair of lateral portions being connected to form the annular shaped fastening member, and the blocking portion being provided on an inner wall of the bottom portion;

wherein the pair of lateral portions each is provided with a recess, an outer contour of the recess and the blocking portion match the shape of the outer surface of the male connector to enable the pair of recesses and the blocking portion to give way to the male connector for insertion when the fastening member is in the unblocking position.

11. The female connector of claim 10, wherein the slot comprises an operating portion accommodating opening extending along the circumference of said female connector housing, the operating portion accommodating opening being provided opposite to the accommodating portion; and wherein when the fastening member is inserted into the female connector housing, the operating portion of the fastening member is in the operating portion accommodating opening, and the bottom portion is at least partially in the accommodating portion.

12. The female connector of claim 10, wherein at least one of the pair of lateral portions comprises a tab protruding along the axial direction of the female connector housing, the tab being provided with an identifying area for providing an identifier; and wherein the female connector housing is provided with at least one window at a corresponding position on its circumference, the window being configured such that when the fastening member is in the blocking position, the window is capable of exposing the identifier, and that when the fastening member is in the unblocking position, the identifier is at least partially covered by the female connector housing.

13. The female connector of claim 5, wherein the operating portion of the fastening member is spaced apart from an outer surface of the female connector housing by a certain distance, and the resilient member is a resilient sheet having a connecting end and a free end, the resilient sheet being elastically deformable about the connecting end, and the resilient sheet extending from the connecting end to the free end in a direction substantially transverse to the axial direction.

14. The female connector of claim 13, wherein the resilient sheet has a resilient sheet top portion and a resilient sheet bottom portion, the resilient sheet top portion having a connecting end and being connected to the operating portion, and the resilient sheet bottom portion having a free end and correspondingly abutting against the female connector housing.

15. The female connector of claim 14, wherein the resilient sheet bottom portion comprises an arc segment, the arc segment protruding towards the female connector housing to abut against the female connector housing.

16. The female connector of claim 1, wherein the female connector housing comprises a body and a connection seat, the connection seat comprising a body connection portion and a fastening member connection portion in the axial direction of the female connector housing, wherein the body connection portion is connected to the body, and the slot is provided on the fastening member connection portion.

17. The female connector of claim 1, wherein the blocking portion is provided with a guiding portion at a front end thereof for cooperating with a guiding portion of the male connector to guide the male connector into the female connector and drive the fastening member from the blocking position to the unblocking position.

18. The female connector of claim 1, wherein the slot extends in a radial direction of the female connector housing, and wherein the fastening member moves along the radial direction of the female connector housing with respect to the female connector housing between the blocking position and the unblocking position.

19. The female connector of claim 1, wherein the blocking portion is formed protruding from the inner wall of the fastening member towards the channel.

* * * * *